US012739385B2

(12) United States Patent
Wang et al.

(10) Patent No.: US 12,739,385 B2
(45) Date of Patent: Sep. 15, 2026

(54) METHODS AND NON-TRANSITORY COMPUTER READABLE STORAGE MEDIUM FOR SPATIAL RESAMPLING TOWARDS MACHINE VISION

(71) Applicant: Alibaba Innovation Private Limited, Singapore (SG)

(72) Inventors: Shurun Wang, Beijing (CN); Yan Ye, San Diego, CA (US)

(73) Assignee: Alibaba Innovation Private Limited, Singapore (SG)

( * ) Notice: Subject to any disclaimer, the term of this patent is extended or adjusted under 35 U.S.C. 154(b) by 85 days.

(21) Appl. No.: 18/618,551

(22) Filed: Mar. 27, 2024

(65) Prior Publication Data

US 2024/0357118 A1 Oct. 24, 2024

Related U.S. Application Data

(60) Provisional application No. 63/495,369, filed on Apr. 11, 2023.

(51) Int. Cl.
*H04N 19/186* (2014.01)
*H04N 19/132* (2014.01)
(Continued)

(52) U.S. Cl.
CPC ......... *H04N 19/132* (2014.11); *H04N 19/172* (2014.11); *H04N 19/186* (2014.11); *H04N 19/436* (2014.11)

(58) Field of Classification Search
CPC .. H04N 19/132; H04N 19/172; H04N 19/186; H04N 19/436; H04N 19/85
See application file for complete search history.

(56) References Cited

U.S. PATENT DOCUMENTS

| | | | | |
|---|---|---|---|---|
| 2022/0086463 A1 | 3/2022 | Coban et al. | | |
| 2023/0116285 A1* | 4/2023 | Cui | ...................... | H04N 19/186 375/240.08 |

(Continued)

FOREIGN PATENT DOCUMENTS

| | | | |
|---|---|---|---|
| CN | 111145290 A | 5/2020 | |
| CN | 113962882 A | 1/2022 | |

(Continued)

OTHER PUBLICATIONS

Gao et al., "Response to VCM Call for Proposals from Tencent—an End-to-end Learning based Solution," International Organisation for Standardisation Organisation Internationale de Normalisation ISO/IEC JTC 1/SC 29/WG 2 MPEG Technical Requirements, ISO/IEC JTC 1/SC 29/WG 2 m60777, 13 pages, 2020.

(Continued)

*Primary Examiner* — Hesham K Abouzahra
(74) *Attorney, Agent, or Firm* — Finnegan, Henderson, Farabow, Garrett & Dunner, LLP

(57) ABSTRACT

A method of encoding a video sequence into a bitstream. The method includes receiving a video sequence; performing a plurality of convolutions on an input image data of the video sequence in YUV format; wherein performing the plurality of convolutions includes performing a first stage convolution on the input image data, wherein the first stage convolution comprises a first convolution and a second convolution that are provided in parallel; performing a second stage convolution on a channel-wise concatenation result of an output of the first convolution and an output of the second convolution; performing a third stage convolution on an output of the second stage convolution; and obtaining an output image data based on an output of the third stage convolution; and encoding the output image data for generating the bitstream.

20 Claims, 20 Drawing Sheets

(51) Int. Cl.
*H04N 19/172* (2014.01)
*H04N 19/436* (2014.01)

(56) References Cited

U.S. PATENT DOCUMENTS

2024/0007658 A1* 1/2024 Mao .................... H04N 19/124
2025/0259275 A1* 8/2025 Xie .......................... G06T 5/60

FOREIGN PATENT DOCUMENTS

| | | | |
|---|---|---|---|
| CN | 114781622 | A | 7/2022 |
| KR | 20220077893 | A | 6/2022 |
| WO | 2022126120 | A1 | 6/2022 |

OTHER PUBLICATIONS

Jiang et al., "An End-to-End Compression Framework Based on Convolutional Neural Networks," IEEE Transactions on Circuits and Systems for Video Technology, vol. 28, No. 10, Oct. 2018, pp. 3007-3018.

Lin et al., "Adaptive Downsampling to Improve Image Compression at Low Bit Rates," IEEE Transactions on Image Processing, vol. 15, No. 9, Sep. 2006, pp. 2513-2521.

Liu et al., "Compressive Sampling-Based Image Coding for Resource-Deficient Visual Communication," IEEE Transactions on Image Processing, vol. 25, No. 6, Jun. 2016, pp. 2844-2855.

Liu et al., "[VCM] Response to VCM Call for Proposals from Tencent and Wuhan University—an ECM based solution," International Organisation for Standardisation Organisation Internationale de Normalisation ISO/IEC JTC 1/SC 29/WG 2 MPEG Technical Requirements, ISO/IEC JTC 1/SC 29/WG 2 m60780, 14 pages, 2022.

Liu et al. "[VCM] response to VCM call for proposals—an EVC based solution," International Organisation for Standardisation Organisation Internationale de Normalisation ISO/IEC JTC 1/SC 29/WG 2 MPEG Technical Requirements, ISO/IEC JTC 1/SC 29/WG 2 m60779, 14 pages, 2022.

Sun et al., "Learned Image Downscaling for Upscaling Using Content Adaptive Resampler," IEEE Transactions on Image Processing, vol. 29, pp. 4027-4040, 2020.

Wang et al., "[VCM] Video Coding for Machines CfP Response from Alibaba and City University of Hong Kong," International Organisation for Standardisation Organisation Internationale de Normalisation ISO/IEC JTC 1/SC 29/WG 2 MPEG Technical Requirements, ISO/IEC JTC 1/SC 29/WG 2 m60737, 16 pages, 2022.

PCT International Search Report and Written Opinion mailed Jun. 24, 2024, issued in corresponding International Application No. PCT/CN2024/087334 (7 pgs.).

* cited by examiner

500

Machine analysis model for task 1 ($M_1$) → $f_1$

Machine analysis model for task n ($M_n$) → $f_n$ $x$

Labels $\{l_i\}$, $i = 1, \ldots n$

Downsampling $\Theta$ (210)

$x_D$

Codec $Co$: Encoder 220 → $b$ → Decoder 230

$\hat{x}_D$

Upsampling $\Phi$ (240)

$\hat{x}_\Phi$

Machine analysis model for task 1 ($M_1$) → $\hat{f}_1$, $L_{ana,1}$

Machine analysis model for task n ($M_n$) → $\hat{f}_n$, $L_{ana,n}$

1000

METHODS AND NON-TRANSITORY COMPUTER READABLE STORAGE MEDIUM FOR SPATIAL RESAMPLING TOWARDS MACHINE VISION

CROSS-REFERENCE TO RELATED APPLICATIONS

The disclosure claims the benefits of priority to U.S. Provisional Application No. 63/495,369, filed on Apr. 11, 2023, which is incorporated herein by reference in its entirety.

TECHNICAL FIELD

The present disclosure generally relates to image or video processing, and more particularly, to methods and a non-transitory computer readable storage medium for performing spatial resampling towards machine vision.

BACKGROUND

A video is a set of static pictures (or "frames") capturing the visual information. To reduce the storage memory and the transmission bandwidth, image or video data can be compressed before storage or transmission and decompressed for display or performing other machine vision tasks. The compression process is usually referred to as encoding and the decompression process is usually referred to as decoding. There are various image and video coding formats which use standardized coding technologies, most commonly based on prediction, transform, quantization, entropy coding and in-loop filtering. For example, the video coding standards, such as the High Efficiency Video Coding (HEVC/H.265) standard, the Versatile Video Coding (VVC/H.266) standard, and AVS standards, specifying the specific video coding formats, are developed by standardization organizations.

In recent years, the development of multimedia acquisition, processing, transmission and application systems leads to an explosive growth of visual data. In visual data-centred applications, the compact representation of image/video has been a long-standing and crucial research topic. Researchers have been focusing on improving human vision quality (e.g., greater texture quality) with less representation expense, and numerous algorithms have been proposed to enhance the rate-distortion and rate-fidelity performance.

SUMMARY

Embodiments of the present disclosure provide a method of encoding a video sequence into a bitstream. The method includes receiving a video sequence; performing a plurality of convolutions on an input image data of the video sequence in YUV format; wherein performing the plurality of convolutions includes performing a first stage convolution on the input image data, wherein the first stage convolution comprises a first convolution and a second convolution that are provided in parallel; performing a second stage convolution on a channel-wise concatenation result of an output of the first convolution and an output of the second convolution; performing a third stage convolution on an output of the second stage convolution; and obtaining an output image data based on an output of the third stage convolution; and encoding the output image data for generating the bitstream.

Embodiments of the present disclosure provide a method of decoding a bitstream to output one or more pictures for a video stream. The method includes receiving a bitstream; and decoding, using coded information of the bitstream, one or more pictures comprising a down-sampled image data in YUV format; and performing a plurality of convolutions on the down-sampled image data, wherein performing the plurality of convolutions further includes performing a first stage convolution on the down-sampled image data, wherein the first stage convolution comprises a first convolution and a second convolution provided in parallel; performing a second stage convolution on a channel-wise concatenation result of an output of the first convolution and an output of the second convolution; performing a third stage convolution on an output of the second stage convolution; performing a bicubic interpolation on the down-sampled image data to obtain a bicubic interpolation result; and performing an element-wise addition to an output of third stage convolution and the bicubic interpolation result to obtain an up-sampled image data.

Embodiments of the present disclosure provide a non-transitory computer readable storage medium storing a bitstream generated by operations including: performing a plurality of convolutions on an input image data of a video sequence in YUV format, wherein performing the plurality of convolutions further includes performing a first stage convolution on the input image data, wherein the first stage convolution comprises a first convolution and a second convolution that are provided in parallel; performing a second stage convolution on a channel-wise concatenation result of an output of the first convolution and an output of the second convolution; performing a third stage convolution on an output of the second stage convolution; and obtaining an output image data based on an output of the third stage convolution; and encoding the output image data for generating the bitstream.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Figure 1:
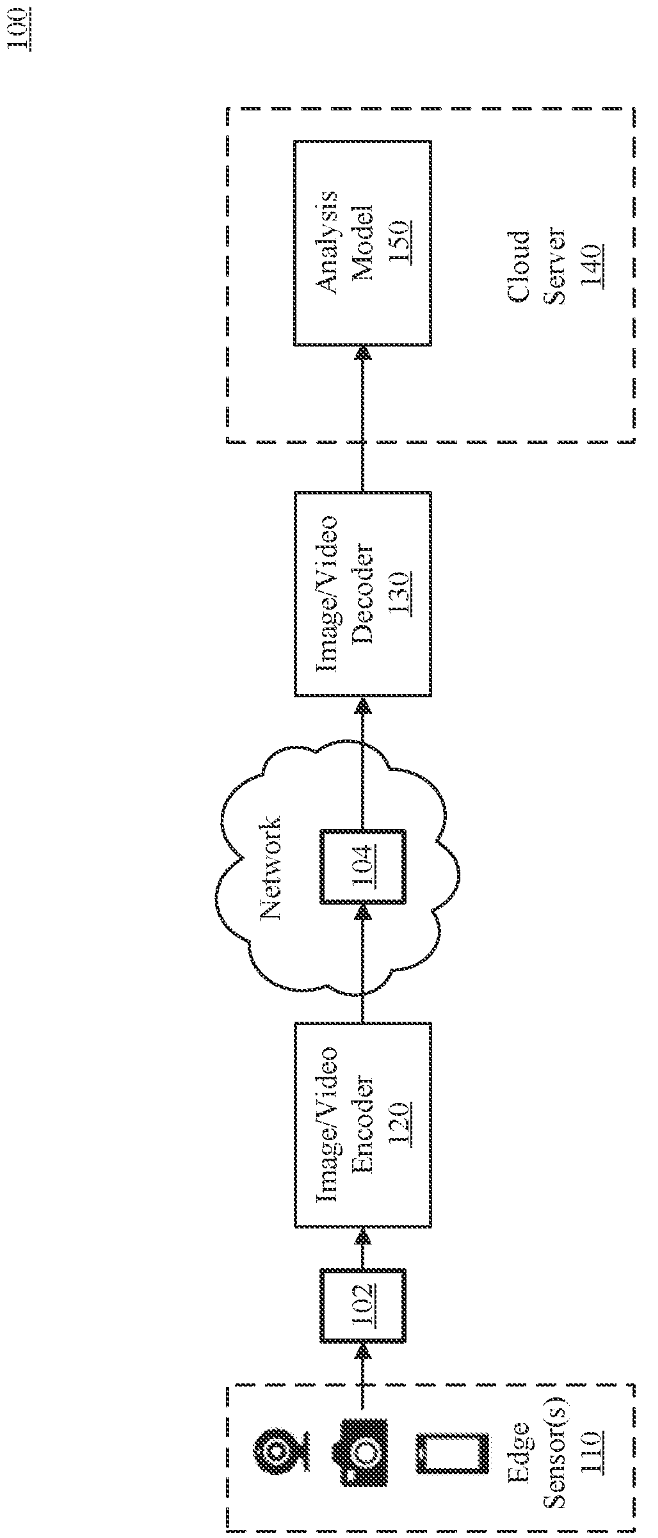
FIG. 1 is a diagram illustrating an exemplary system for collecting visual data and performing computer vision task, according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims. Particular aspects of the present disclosure are described in greater detail below. The terms and definitions provided herein control, if in conflict with terms or definitions incorporated by reference.

The compact representation of image/video plays a fundamental role in visual signal storage and transmission for human perception quality. In recent years, with the development of artificial intelligence (AI), a variety of progress has been achieved from the perspective of AI-based machine vision. As such, the compact representation of image/video for machine vision has attracted the interest of both academia and industry. Motivated by the spatial continuity of images/videos, spatial resampling has been applied to improve the coding efficiency for machine vision, which down-samples the visual signal before compression and upsamples the reconstructed visual signal.

The spatial resampling could achieve better rate-distortion performance by reducing the data volume before compression and promoting the reconstruction quality after compression. Motivated by this, various algorithms have been proposed. Specifically, a down-sampling based paradigm can be proposed to improve image compression performance at low bitrates. The local random convolution kernel can be proposed to preserve the high-frequency information at low bitrate compression. In the era of deep learning, a convolutional neural network-based end-to-end image compression framework can be built and achieve performance improvement, compared with several existing coding standards. Over the past years, spatial resampling algorithms are built to improve the representation efficiency of visual signal in terms of both signal fidelity and human perception. However, the fidelity degradation of analysis tasks is not fully considered.

In order to improve the spatial resampling performance for machine vision, a content adaptive resampling can be adopted and optimized to minimize the Mean Absolute Error (MAE) between the original and resampled images. Motivated by the characteristics of machine vision-oriented compression compared to the compression for HVS, a joint loss function can be proposed to improve the coding efficiency for machine vision tasks, which include the signal-level distortion and the loss function for instance segmentation. Moreover, the spatial resampling model can be jointly optimized with the codec to further improve the compression performance. Due to the non-differentiable nature of codecs, a codec simulation network can be adopted to back-propagate the compression loss through the resampling network. In some embodiments, an iterative optimization algorithm can be developed for the joint optimization of deep learning spatial resampling model and VVC.

Various machine-oriented spatial resampling models are mainly applied to the visual signal in RGB (Red-Green-Blue) format. However, most of the hybrid coding frameworks are built and optimized in the YUV format. For example, the data format in many codecs, such as H.264/Advanced Video Coding (AVC), H.265/High Efficiency Video Coding (HEVC), and H.266/Versatile Video Coding (VVC), are YUV format, especially with YUV 420 format. A YUV is actually the name of the color space that is common to all "YUV" pixel formats. Contrary to RGB formats, YUV colors are represented with one "luminance" component called Y (equivalent to grey scale) and two "chrominance" components, called U (blue projection) and V (red projection) respectively. YUV can also be referred to as YCbCr. YUV420 means that the U and V components have half the resolution of the luma (Y) component, in the horizontal and vertical directions. Therefore, additional color conversion and resampling for the U and V components are required when the codec is combined with spatial resampling model. In the present disclosure, a spatial resampling method on the YUV format towards machine vision is provided to accommodate the spatial resampling to YUV format.

FIG. 1 is a diagram illustrating a system 100 for collecting visual data and performing computer vision task, according to some embodiments of the present disclosure. As shown in FIG. 1, the system 100 includes one or more edge sensors 110, an encoder 120 for performing image/video encoding, a decoder 130 for performing image/video decoding, and a cloud server 140 for performing computer vision tasks using analysis model(s) 150. Particularly, in some deep learning applications, such as the autopilot, computer vision tasks, including object detection and image classification, have taken a significant portion of visual data consumers. The compression of visual data constitutes the basic infrastructure to support these applications from the perspective of Compress-then-Analyse (CTA), which can be referred to as a framework for machine vision application.

For example, the edge sensor(s) 110 may include devices having a photographing or video recording function, such as cameras, smartphones, video cameras, monitors, and digital cameras, to collect the visual data 102, but the present disclosure is not limited thereto. As shown in FIG. 1, the visual data 102 collected with the edge sensor(s) 110 can be encoded, by the encoder 120, into a bitstream 104 and transmitted via the network. The encoded bitstream 104 is decoded by the decoder 130 and transferred to the cloud server 140. Then, the reconstructed visual data is further fed into the analysis model 150 for computer vision tasks.

In the system 100, image/video compression can be applied to the visual data 102 to obtain a compact image. The development of image/video compression algorithms is coding standard driven. For texture compression, a series of standards have been developed to compress visual data, such as JPEG and JPEG 2000 for still image compression, and H.264/AVC, H.265/HEVC and VVC (Versatile Video Coding) for video data compression. In order to improve the compression performance furthermore, numerous algorithms, including matrix weighted intra prediction, quadtree plus binary, extended coding unit partitioning and mode-dependent non-separable secondary transform, are developed for the future video compression standards. In addition, various optimization algorithms have been proposed in terms of rate-distortion optimization for both texture and feature quality with the encoder optimization. Moreover, with the unprecedented development of visual data understanding, managing thousands of visual data bitstreams compactly and transmitting the data simultaneously for further analysis become challenges in various applications and fields, such as smart cities and Internet of Video Things (IoVT).

In the cloud server 140, the analysis performance may be influenced due to the degradation of feature quality in a texture quality-oriented compression. To address this problem, Moving Picture Experts Group (MPEG) has been developing standards for compact visual feature representation to reduce the representation data size of analysis feature and facilitate various intelligent analysis tasks with front-end intelligence. For example, Compact Descriptors for Visual Search (CDVS) and Compact Descriptors for Video Analysis (CDVA) standards aim to achieve compact descriptors for visual data. The standardization of video coding for machine is also launched to figure a complete picture of the compact representation of visual data in terms of the machine vision.

In visual data representation and understanding, deep learning has revealed its strong representation capability in various applications. In some embodiments, deep neural network based end-to-end compression frameworks can be applied. For example, a recurrent neural network (RNN) can be applied to the end-to-end learned image compression (LIC) to achieve a comparable performance compared with JPEG. A convolutional neural network (CNN) based end-to-end image compression model, motivated by a block-based transform in image/video compression, can be proposed and combined with a discreate cosine transform (DCT) to achieve a comparable performance compared with JPEG at low bitrate. In some embodiments, nonlinear transformation is one of the properties of neural networks consistent with a human visual system (HVS). In some embodiments, a generalized divisive normalization (GDN) can be proposed to optimize the end-to-end nonlinear transform codec for perceptual quality. On this basis, a density estimation model can be combined with a cascade of GDNs and surpassed the compression performance of JPEG 2000.

In some embodiments, the redundancy of the latent code in end-to-end image compression is further eliminated under an entropy penalization constraint with weight reparameterization, which is implemented with a variational hyper-prior model. In order to further exploit the correlation of the latent representation, an autoregressive model may be proposed to achieve a superior rate-distortion performance when compared with the existing image codec, e.g., Better Portable Graphics (BPG), in terms of both Peak Signal-to-Noise Ratio (PSNR) and Multi-Scale Structural Similarity (MS-SSIM) distortion metrics. In some embodiments, a discretised Gaussian Mixture Likelihoods is used to parameterize the distributions of the latent representations to further improve the accuracy of the entropy models for the rate estimation. Accordingly, a more accurate and flexible entropy model can be formulated to achieve a comparable performance with the latest compression standard VVC regarding bitrate-PSNR performance.

In embodiments of the present disclosure, a framework for end-to-end optimization of spatial resampling is provided to improve the machine vision performance. Particularly, the spatial resampling achieves better rate-distortion performance by reducing the data volume before compression and improving the reconstruction quality after compression. In some embodiments, algorithms are proposed based on the spatial resampling. For example, a down-sampling based paradigm may be provided to improve image compression performance at low bitrates. In another example, the local random convolution kernel is proposed to preserve high frequency information at low bitrate compression. With the deep learning technologies, a CNN-based end-to-end image compression framework can be built to achieve performance improvement and outperform existing coding standards.

With the progresses of various machine analysis tasks, analysis feature compression algorithms can be proposed to improve the visual data compression efficiency towards machine vision and accommodate with the rapid development of machine analysis applications. The spatial resampling may be proposed to improve the representation efficiency of visual data and accommodate with existing codecs. However, traditional visual data coding by existing codecs generally focuses on the signal fidelity and human vision quality, and thus the performance of spatial resampling for the compression towards machine vision may be limited if the proposed spatial resampling methods only focus on the signal fidelity and human perception. To address the issues above, in some embodiments of the present disclosure, the spatial resampling algorithms are also built based on the consideration of the fidelity degradation of machine analysis tasks, and adopt adaptive resampling settings to further improve the machine vision performance.

Figure 2:
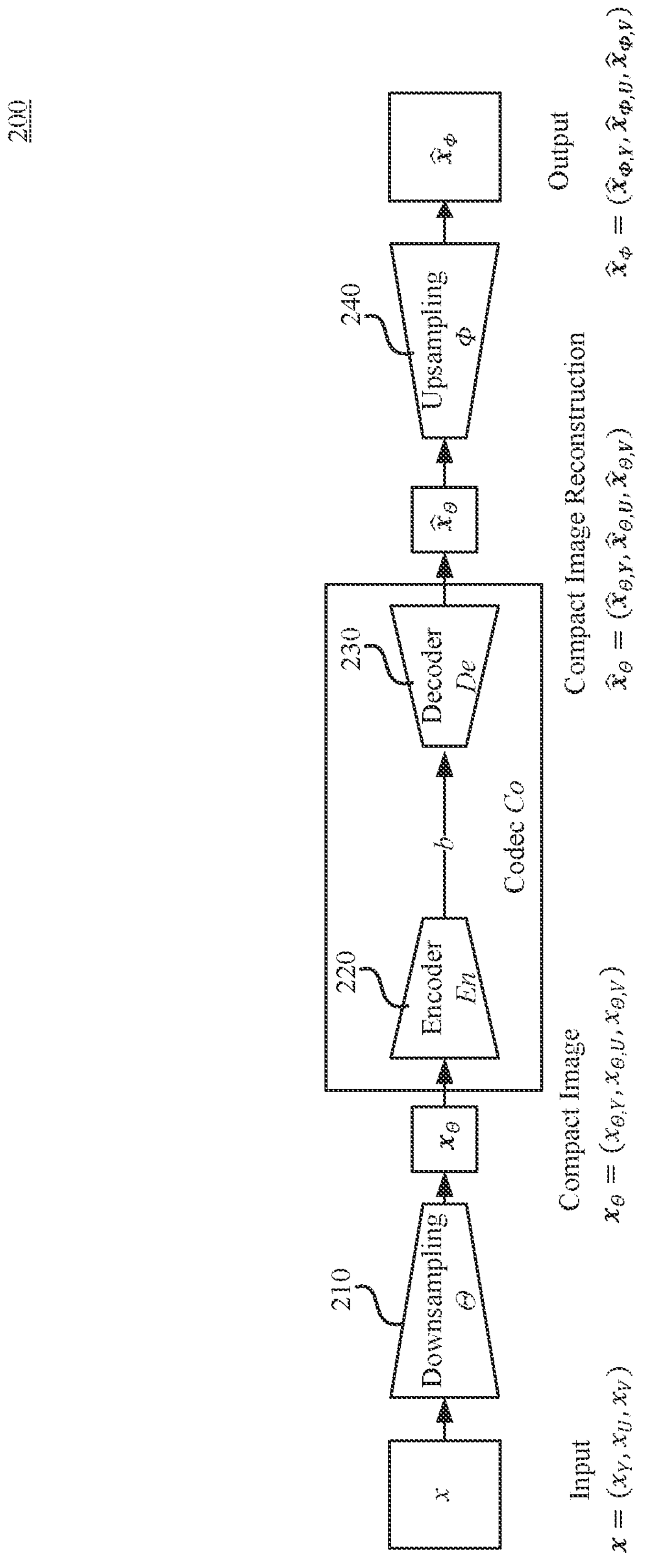
FIG. 2 is a diagram illustrating an exemplary framework for end-to-end optimization of spatial resampling, according to some embodiments of the present disclosure.

Reference is made to FIG. 2, which is a diagram illustrating a framework 200 for end-to-end optimization of spatial resampling, according to some embodiments of the present disclosure. As shown in FIG. 2, the framework 200 includes a down-sampling module 210, a codec Co including an encoder side 220 configured to output an encoded bitstream b and a decoder side 230 configured to decode the bitstream b, and an up-sampling module 240. The downsampling module 210 and the up-sampling module 240 can be configured to provide compact image representation before the compression and perform machine analysis information restoration after the compression. A paradigm of the training stage is shown in FIG. 2. In some embodiments, the compression codec is not involved in a training stage due to the non-differentiability of visual data codecs. Specifically, an input image x is fed into the down-sampling module 210, and the down-sampling module 210 is configured to accordingly output a down-sampled image data, e.g., compact image representation $x_\theta=(x_{\theta,Y}, x_{\theta,U}, x_{\theta,V})$.

The up-sampling module 240 is configured to use the down-sampled image data, or a reconstructed image data, e.g., a compact image reconstruction $\hat{x}_\theta=(\hat{x}_{\theta,Y}, \hat{x}_{\theta,U}, \hat{x}_{\theta,V})$ from the decoder side 230 as an input to recover the machine analysis information, and generate an up-sampled image data, e.g., an up-sampled image $\hat{x}_\Phi=(\hat{x}_{\Phi,Y}, \hat{x}_{\Phi,U}, \hat{x}_{\Phi,V})$. The down-sampling module 210 and the up-sampling module 240 in FIG. 2 can be implemented using convolutional neural networks and optimized in an end-to-end manner in the training stage.

For example, in some embodiments, the down-sampling module 210 may include three stages of convolutional layers and adopt Rectified Linear Unit (ReLU) as the activation function for defining the output of the node given an input or set of inputs. For example, the activation function in the neural network can define how the weighted sum of the input is transformed into the output from one or more nodes in the current layer of the neural network. The number of convolutional layers can be varied according to practical application. Parameters for each convolutional layer are set according to the type of YUV format and the number of convolutional layers. In the present disclosure, YUV420 is used as an example.

In some embodiments, the up-sampling module 240 includes three stages of convolutional layers, with the residual connection from the input of the first convolutional layer to the output of the last convolutional layer. It can be understood that the number of convolutional layers can be varied according to practical application. A set of parameters for each convolutional layer are set according to the type of YUV format and the number of convolutional layers. YUV format may include YUV 444, YUV422, YUV420, etc.

Figure 3A:
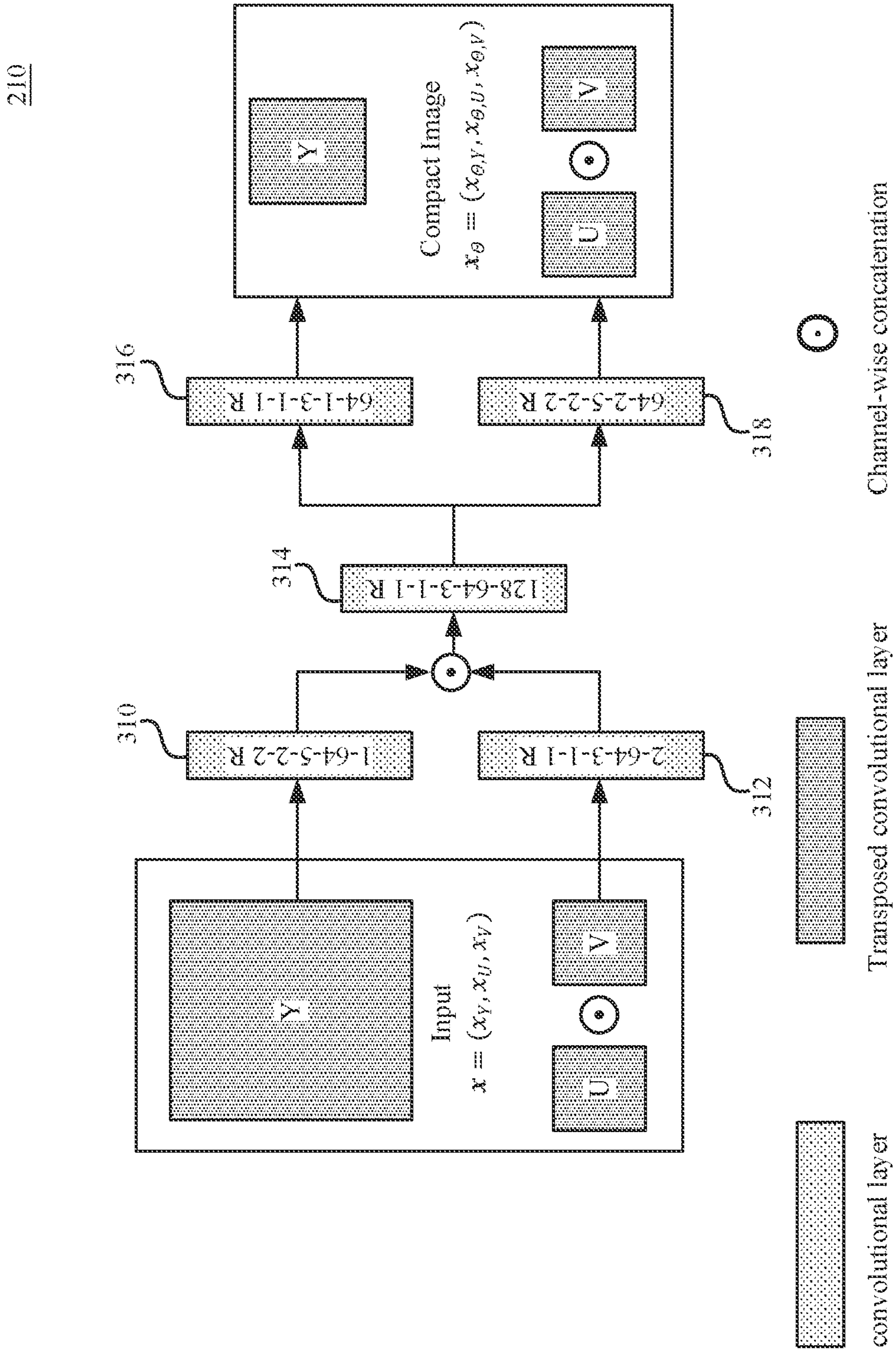
FIG. 3A is a diagram illustrating an exemplary network structure of the down-sampling module, according to some embodiments of the present disclosure.
Figure 3B:
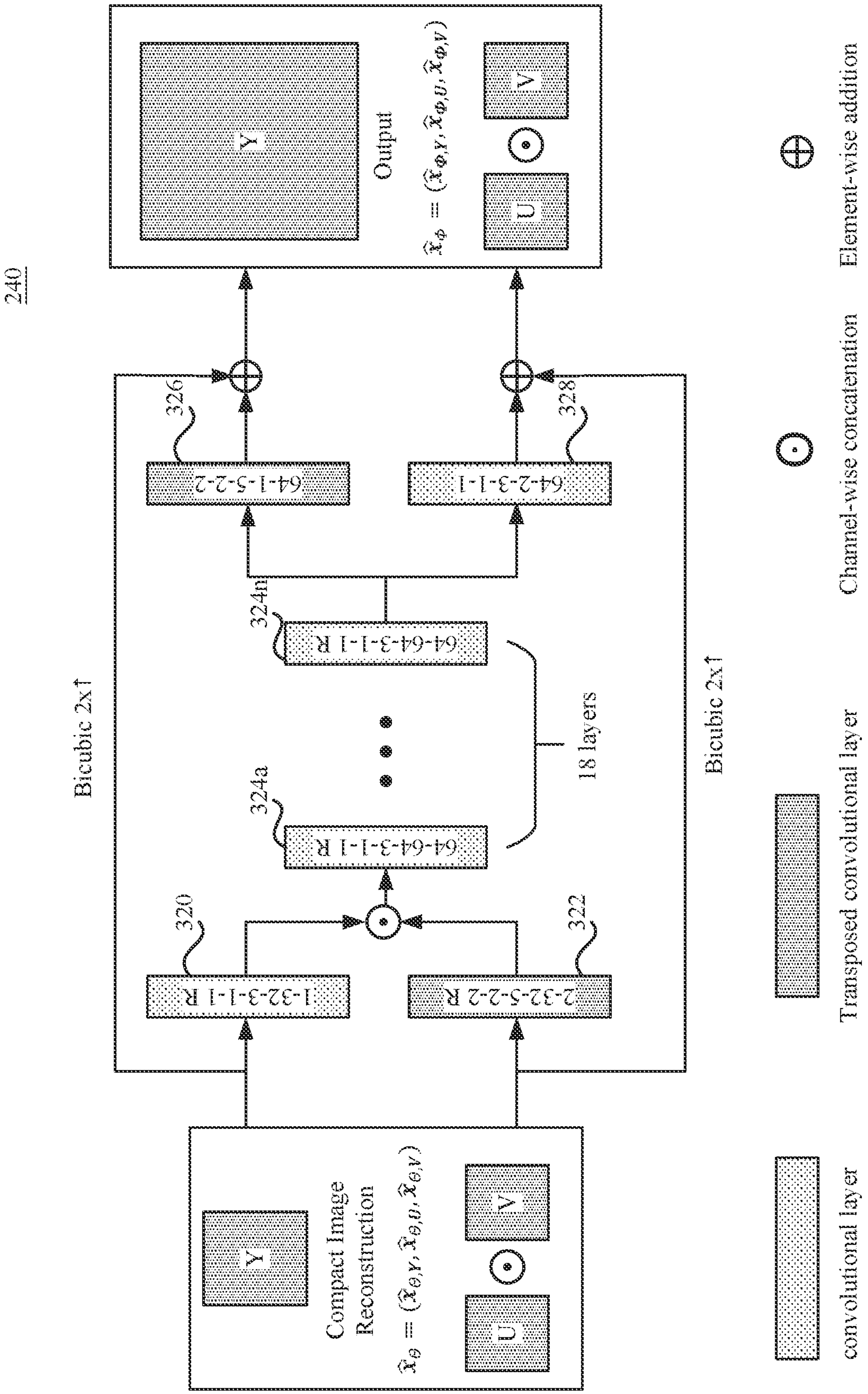
FIG. 3B is a diagram illustrating an exemplary network structure of the up-sampling module, according to some embodiments of the present disclosure.

FIG. 3A illustrates an exemplary network structure of the down-sampling module 210 according to some embodiments of the present disclosure. FIG. 3B illustrates an exemplary network structure of the up-sampling module 240 according to some embodiments of the present disclosure. In FIG. 3A and FIG. 3B, the parameters for each conventional layer may include an input channel number Cin, an output channel number Cout, a kernel size k, a stride s, and a padding size p, which are denoted as Cin-Cout-k-s-p. Moreover, R indicates the ReLU function, if ReLU is applied to the convolutional layer as the activation function.

Referring to FIG. 3A, in the down-sampling module 210, a first stage of convolutional layer includes two channels of convolutional layer, a first channel of convolutional layer is configured to perform one or more convolution for a Y component of an input image, and a second channel of convolutional layer is configured to perform one or more convolution for a U component and Y component of the input image. The first channel of convolutional layer and the second channel of convolutional layer are in parallel, that is, the operations in the first channel of convolutional layer and the second channel of convolutional layer are independent from each other, and can be performed at the same time. In this example, the first channel of convolutional layer includes a convolutional layer 310, and the second channel of convolutional layer includes a convolutional layer 312. In some embodiments, the first channel of convolutional layer and the second channel of convolutional layer may include more than one convolutional layer respectively. As shown in FIG. 3A, the Y component of the input image x is fed to the convolutional layer 310 ("1-64-5-2-2 R"). A channel-wise concatenation is performed to the U component and the V component of the input image x, and the concatenation result is then fed to the convolutional layer 312 ("2-64-3-1-1 R").

A second stage of convolutional layer includes a convolutional layer 314. Another channel-wise concatenation is performed to the output of the convolutional layer 310 and the output of the convolutional layer 312, and the concatenation result is then fed to the convolutional layer 314 ("128-64-3-1-1 R").

A third stage of convolutional layer includes two channels of convolutional layer, a first channel of convolutional layer is configured to perform one or more convolution to obtain a Y component of a compact image, and a second channel of convolutional layer is configured to perform one or more convolution to obtain a U component and Y component of the compact image. The first channel of convolutional layer and the second channel of convolutional layer are in parallel, that is, the operations in the first channel of convolutional layer and the second channel of convolutional layer are independent from each other, and can be performed at the same time. In this example, the first channel of convolutional layer includes a convolutional layer 316, and the second channel of convolutional layer includes a convolutional layer 318. In some embodiments, the first channel of convolutional layer and the second channel of convolutional layer may include more than one convolutional layer respectively. Referring to FIG. 3A, the output of the convolutional layer 314 is fed to convolutional layers 316 ("64-1-3-1-1 R") and 318 ("64-2-5-2-2 R") as an input. Then, the Y component of the compact image representation $x_\theta$, and a channel-wise concatenation result of the U component and the V component of the compact image representation $x_\theta$ can be respectively obtained based on the output of the convolutional layer 316 and the output of the convolutional layer 318.

As shown in FIG. 3A, the down-sampling module 210 includes three stages of down-sampling convolutional layers. In some embodiments, adopt Rectified Linear Unit (ReLU) is applied as the activation function for defining the output of the node given an input or set of inputs.

As shown in FIG. 3B, in the up-sampling module 240, a first stage of convolutional layer includes two channels of convolutional layer, a first channel of convolutional layer is configured to perform one or more convolution for a Y component of a compact image reconstruction, and a second channel of convolutional layer is configured to perform one or more convolution for a U component and Y component of the compact image reconstruction. The first channel of convolutional layer and the second channel of convolutional layer are in parallel, that is, the operations in the first channel of convolutional layer and the second channel of convolutional layer are independent from each other, and can be performed at the same time. In this example, the first channel of convolutional layer includes a convolutional layer 320, and the second channel of convolutional layer includes a convolutional layer 322. In some embodiments, the first channel of convolutional layer and the second channel of convolutional layer may include more than one convolutional layer respectively. As shown in FIG. 3B, the Y component of the compact image reconstruction $\hat{x}_\theta$ is fed to a convolutional layer 320 ("1-32-3-1-1 R"). The channel-wise concatenation result of the U component and the V component of the compact image reconstruction $\hat{x}_\Theta$ is fed to a convolutional layer 322 ("2-32-5-2-2 R"). The convolutional layer 322 is a transposed convolutional layer.

A second stage of convolutional layer includes a series of convolutional layers, for example convolutional layers 324*a*-324*n*. The number of the series of convolutional layers can be varied according to practical needs. In some embodiments, the number of the series of convolutional layers is between 15 to 25. It can be understood that the parameters for each convolutional layers can be adjusted according to the number of the series of convolutional layers. Referring to FIG. 3B, a channel-wise concatenation is performed to the output of the convolutional layer 320 and the output of the transposed convolutional layer 322, and the concatenation result is then fed to a series of 18 convolutional layers 324*a*-324*n* ("64-64-3-1-1 R"). In this example, the number of the series of convolutional layers is 18. A series of convolutional layers means a plurality of convolutional layers are connected in series. An output of a previous convolutional layer is fed to a next convolutional layer as an input.

A third stage of convolutional layer includes two channels of convolutional layer, a first channel of convolutional layer is configured to perform one or more convolution to obtain a Y component of an output image, and a second channel of convolutional layer is configured to perform one or more convolution to obtain a U component and Y component of the output image. The first channel of convolutional layer and the second channel of convolutional layer are in parallel, that is, the operations in the first channel of convolutional layer and the second channel of convolutional layer are independent from each other, and can be performed at the same time. In this example, the first channel of convolutional layer includes a convolutional layer 326, and the second channel of convolutional layer includes a convolutional layer 328. In some embodiments, the first channel of convolutional layer and the second channel of convolutional layer may include more than one convolutional layer respectively. Referring to FIG. 3B, the output of the $18^{th}$ convolutional layer 324*n* is fed to a convolutional layer 326 ("64-1-5-2-2"). The convolutional layer 326 is a transposed convolutional layer. Then, a bicubic interpolation is performed to the Y component of the compact image reconstruction $\hat{x}_\Theta$, and an element-wise addition to the output of the transposed convolutional layer 326 is performed to obtain the Y component of the up-sampled image $\hat{x}_\Phi$. Similarly, the output of the $18^{th}$ convolutional layer 324*n* is fed to a convolutional layer 328 ("64-2-3-1-1") as an input. Then, a bicubic interpolation is performed to the channel-wise concatenation result of the U component and the V component of the compact image reconstruction $\hat{x}_\Theta$, and an element-wise addition to the output of the convolutional layer 328 is performed to obtain the channel-wise concatenation result of the U component and the V component of the up-sampled image $\hat{x}_\Phi$, i.e., the output image. Alternatively stated, the residual connection may provide an alternative path for data to reach latter parts of the neural network by skipping convolutional layers 320, 322, 324*a*-324*n* in the up-sampling module 240. As shown in FIG. 3B, in some embodiments, the up-sampling module 240 may adopt ReLU as the activation function of convolutional layers, except for the last-stage convolutional layers 326, 328 in the up-sampling module 240. That is, ReLU may be the activation function of first stage and second stage of convolutional layers (e.g., layers 320, 322, 324*a*-324*n*), and the third stage of convolutional layers 326, 328 may not have an activation function.

As shown in the above embodiments, the down-sampling module 210 includes a first convolutional layer 310 configured to receive the Y component of the input image data, a second convolutional layer 312 configured to receive a channel-wise concatenation result of the U component and the V component of the input image data, a third convolutional layer 314 configured to receive a channel-wise concatenation result of an output of the first convolutional layer 310 and an output of the second convolutional layer 312, a fourth convolutional layer 316 configured to receive an output of the third convolutional layer 314; and a fifth convolutional layer 318 configured to receive the output of the third convolutional layer 314. The Y component of the down-sampled image data is obtained by an output of the fourth convolutional layer 316, and the U component and the V component of the down-sampled image data are obtained by an output of the fifth convolutional layer 318.

The up-sampling module 240 includes a first convolutional layer 320 configured to receive a Y component of the down-sampled image data or the reconstructed image data, a first transposed convolutional layer 322 configured to receive a channel-wise concatenation result of a U component and a V component of the down-sampled image data or the reconstructed image data, a plurality of convolutional layers 324*a*-324*n* in series to receive a channel-wise concatenation result of an output of the first convolutional layer 320 and an output of the first transposed convolutional layer 322, a second transposed convolutional layer 326 configured to receive the output of convolutional layers 324*a*-324*n* in series, and a second convolutional layer 328 configured to receive the output of the convolutional layers 324*a*-324*n* in series. The Y component of the up-sampled image data is obtained according to an output of the second transposed convolutional layer 326 and the Y component of the down-sampled image data or the reconstructed image data, and the U component and the V component of the up-sampled image data is obtained according to an output of the second convolutional layer 328 and the U component and the V component of the down-sampled image data or the reconstructed image data.

Figure 4:
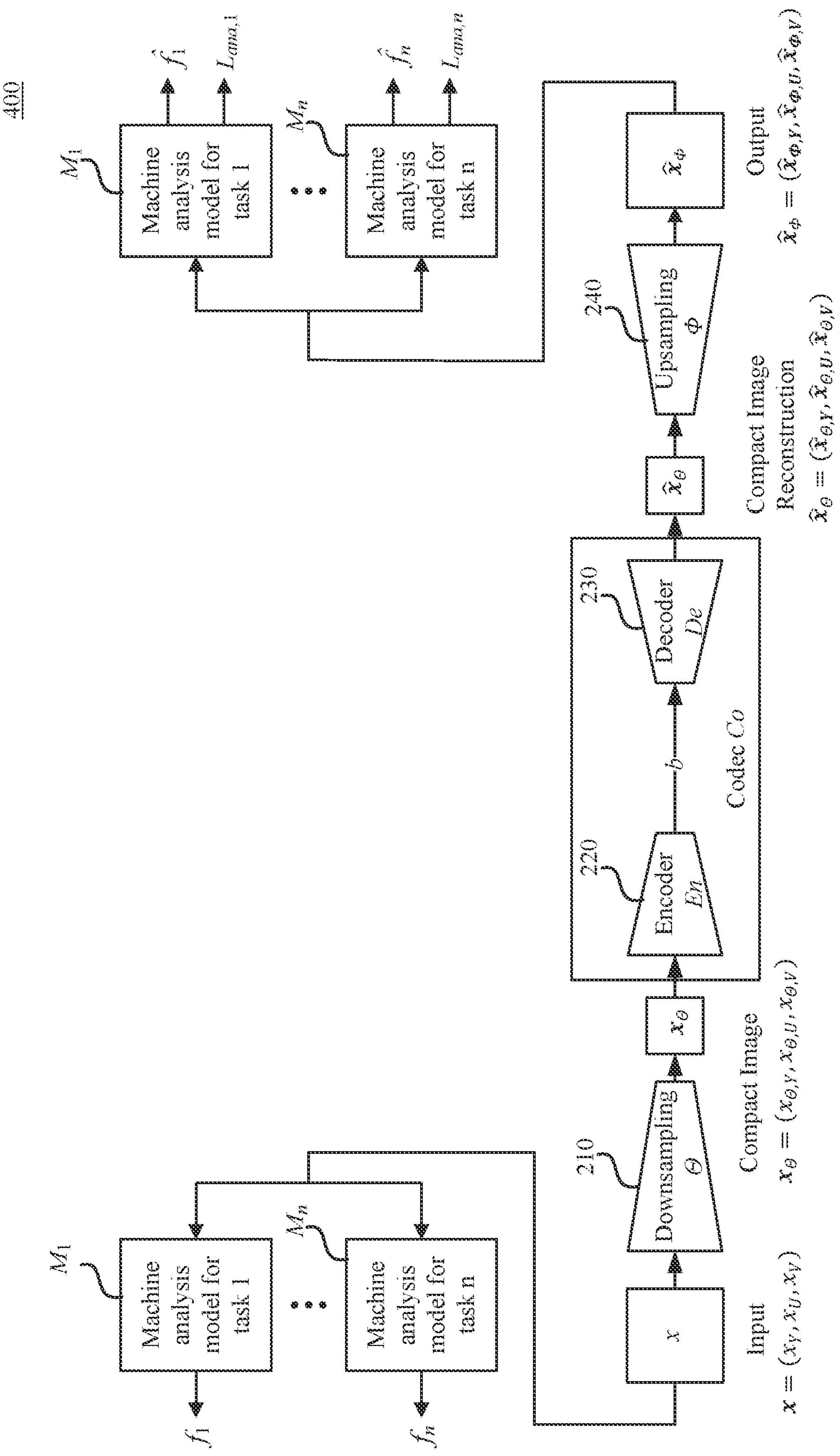
FIG. 4 is a diagram illustrating an exemplary framework for end-to-end optimization of spatial resampling, according to some embodiments of the present disclosure.

FIG. 4 is a diagram illustrating a framework 400 for end-to-end optimization of spatial resampling, according to some embodiments of the present disclosure. Referring to FIG. 4, multiple machine analysis models may be configured to perform analysis for multiple tasks to an image of interest. For example, the framework 400 may include n pre-trained machine analysis models $M_1$-$M_n$ associated with n different tasks. Accordingly, the i-th machine analysis model $M_i$ is configured to obtain an extracted feature map $f_i$ from the input image x, and obtain an extracted feature map $\hat{f}_i$ from the up-sampled image x, respectively. In addition, in some embodiments, for each machine analysis model $M_i$, a corresponding machine analysis loss function $L_{ana,i}$ can be determined according to the definition of the machine analysis model $M_i$.

Based on the input image x, the up-sampled image $\hat{x}_\Phi$, the extracted feature maps $f_i$ and $\hat{f}_i$, and machine analysis loss functions $L_{ana,1}$-$L_{ana,n}$ for machine analysis models $M_1$-$M_n$, a joint loss function for multitask learning can be proposed for training the down-sampling module 210 and the up-sampling module 240. In some embodiments, the loss function may include a contour loss function $L_C$, multiple feature map distortions $L_{fea,1}$-$L_{fea,n}$ respectively associated with the analysis models $M_1$-$M_n$, multiple analysis loss functions $L_{ana,1}$-$L_{ana,n}$ respectively associated with the analysis models $M_1$-$M_n$, or any combinations thereof.

An example of the joint loss function $L(x, x_m, x_U)$ can be represented by the following equation:

$$L(x, x_m, \hat{x}_\Phi) = w_C L_C(x, x_m, \hat{x}_\Phi) + \sum_i^n w_{fea,i} L_{fea,i}(T(x), T(\hat{x}_\Phi)) + \sum_j^n w_{ana,j} L_{ana,j}(T(\hat{x}_\Phi), \{l_i\}),$$

where $w_C$, $w_{fea,i}$, and $w_{ana,j}$ respectively denote the weights of loss components, {li} denotes the label information for various tasks, and Tis the color conversion from the YUV format to the RGB format.

In the equation above, $L_C$ denotes the contour loss associated with object contours, $L_{fea,i}$ denotes the feature map distortion for the i-th machine task, and $L_{ana,j}$ denotes the machine analysis loss function for the j-th machine task. It would be appreciated that in other embodiments, the joint loss function for multitask learning may include one or more loss components selected from the contour loss $L_C$, the feature map distortion $L_{fea,i}$, and the machine analysis loss function $L_{ana,j}$. In other words, based on the actual needs and requirements of different applications, one or more of the weights $w_C$, $w_{fea,i}$, and $w_{ana,j}$ may be zero, eliminating corresponding loss component(s) to simplify the joint loss function and improve the overall efficiency.

The contour loss $L_C$ pays more attention to the object contours. Specifically, in the equation above, the contour loss $L_C$ focusing on the object contours can be formulated as:

$$L_C(x, x_m, \hat{x}_\Phi) = \sum_{c\in\{Y,U,V\}} (G(K(C(x_{m,c}))) + 1)\|\hat{x}_{\Phi,c} - x_c\|_2^2,$$

$$C(x_{m,c}) = D(x_{m,c}; S) - E(x_{m,c}; S),$$

where $x_m=(x_{m,Y}, x_{m,U}, x_{m,V})$ denotes a mask image for the annotated objects in the dataset in the YUV format. D and E denote the dilation and erosion with 5×5 mask S. C denotes a difference between dilated and eroded images, which is associated with the object boundaries. K denotes a hyperparameter to assign high values for contour parts. For example, K may be empirically set as 5. G represents a Gaussian filter with 5×5 range and 1 represents a matrix with the same size of the mask image $x_{m,c}$, $c\in\{Y, U, V\}$ and all values are 1.

In some embodiments, in order to preserve the information of various machine tasks, the multitask loss function can be introduced in terms of the feature map distortion $L_{fea,i}$ for one or more machine tasks. Each feature map distortion $L_{fea,i}$ can be obtained based on extracted feature maps of the corresponding analysis model from the input image x and the up-sampled image $\hat{x}_\Phi$. For example, for i-th machine task using a machine analysis model $M_i$, the feature map distortion $L_{fea,i}$ may be defined as the mean squared difference of the analysis model feature maps from original image and the compressed image. For example, the feature map distortion $L_{fea,i}$ may be formulated as:

$$L_{fea,i}(T(x), T(\hat{x}_\Phi)) = \|f_i - \hat{f}_i\|_2^2,$$

where $f_i$ and $\hat{f}_i$ are the extracted feature maps of pre-trained machine analysis model $M_i$ from input image x and the upsampled image $\hat{x}_\Phi$ respectively.

Similarly, in some embodiments, the multitask loss function can be introduced in terms of the machine analysis loss function $L_{ana,j}$ for one or more machine tasks to preserve the information of various machine tasks. Specifically, the machine analysis loss function $L_{ana,j}$ corresponding to specific machine analysis task follows the definition of j-th analysis model. In various embodiments, weights and components of the loss function may be adaptively adjusted according to the application scenarios. Above equations are merely examples and not meant to limit the present disclosure.

In some embodiments, the framework 400 can be optimized in an end-to-end manner by skipping the codec Co, which means $x_\theta=\hat{x}_\theta$. In some other embodiments, the framework can also be optimized in an iterative method when the codec Co is considered.

In some embodiments, an alternative method for spatial resampling on the YUV format is to apply the existing RGB based spatial resampling model to the YUV format. Specifically, at the encoder side, the conversions with YUV to RGB and RGB to YUV can be performed before and after the spatial down-sampling, respectively. In the same vein, at the decoder side, the conversions with YUV to RGB and RGB to YUV are performed before and after the spatial up-sampling, respectively.

Figure 5A:
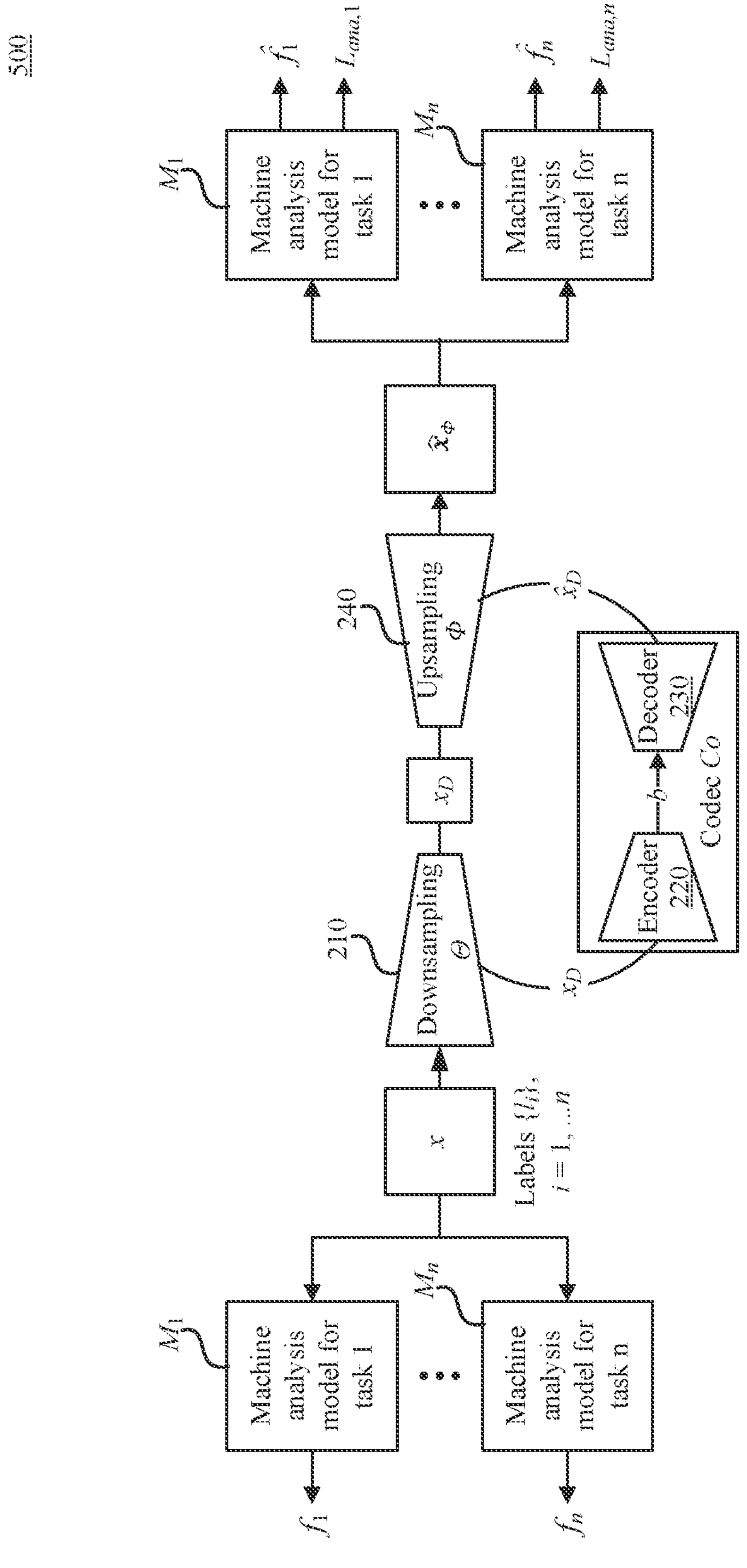
FIG. 5A is a diagram illustrating another exemplary framework for end-to-end optimization of spatial resampling, according to some embodiments of the present disclosure.
Figure 5B:
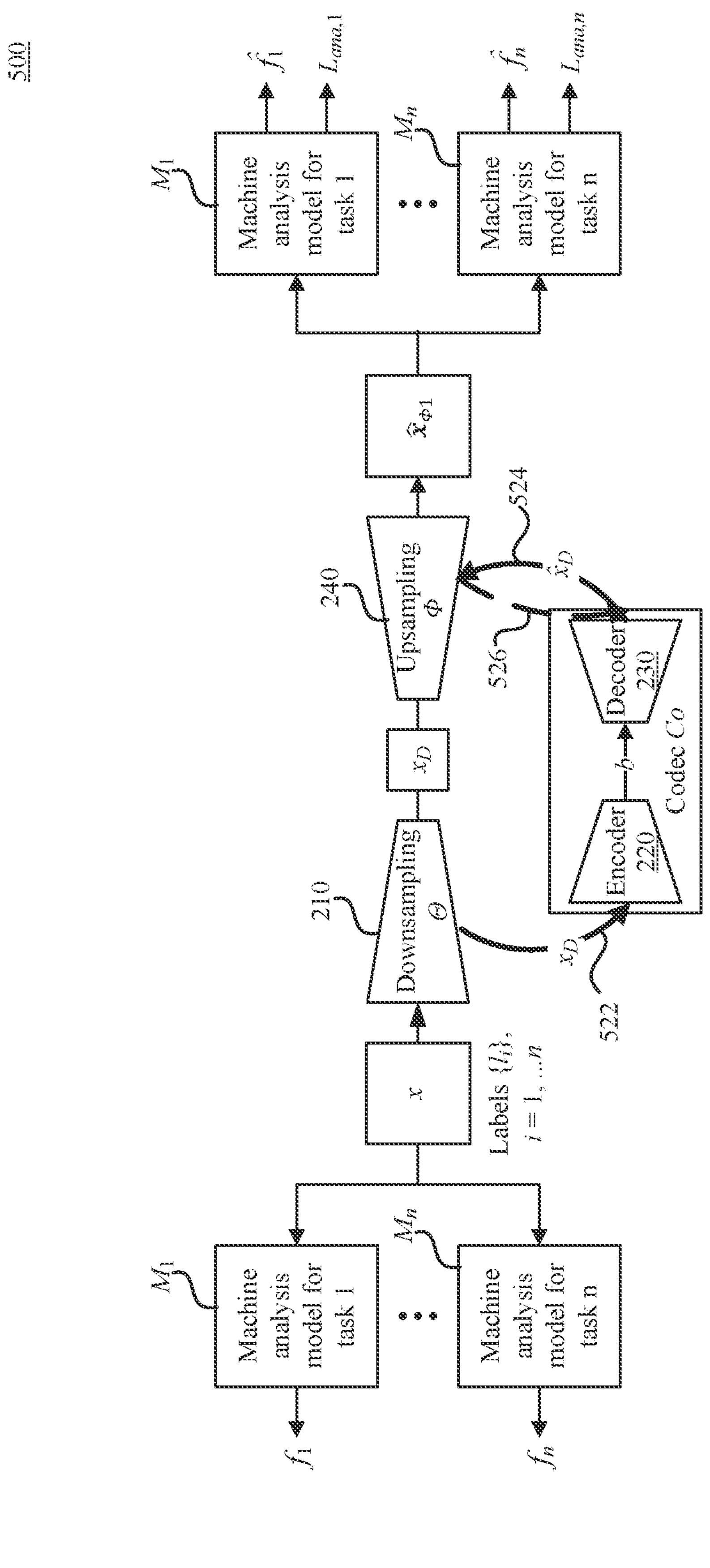
FIG. 5B is a diagram illustrating the exemplary optimization of the up-sampling module for the framework in FIG. 5A, according to some embodiments of the present disclosure.
Figure 5C:
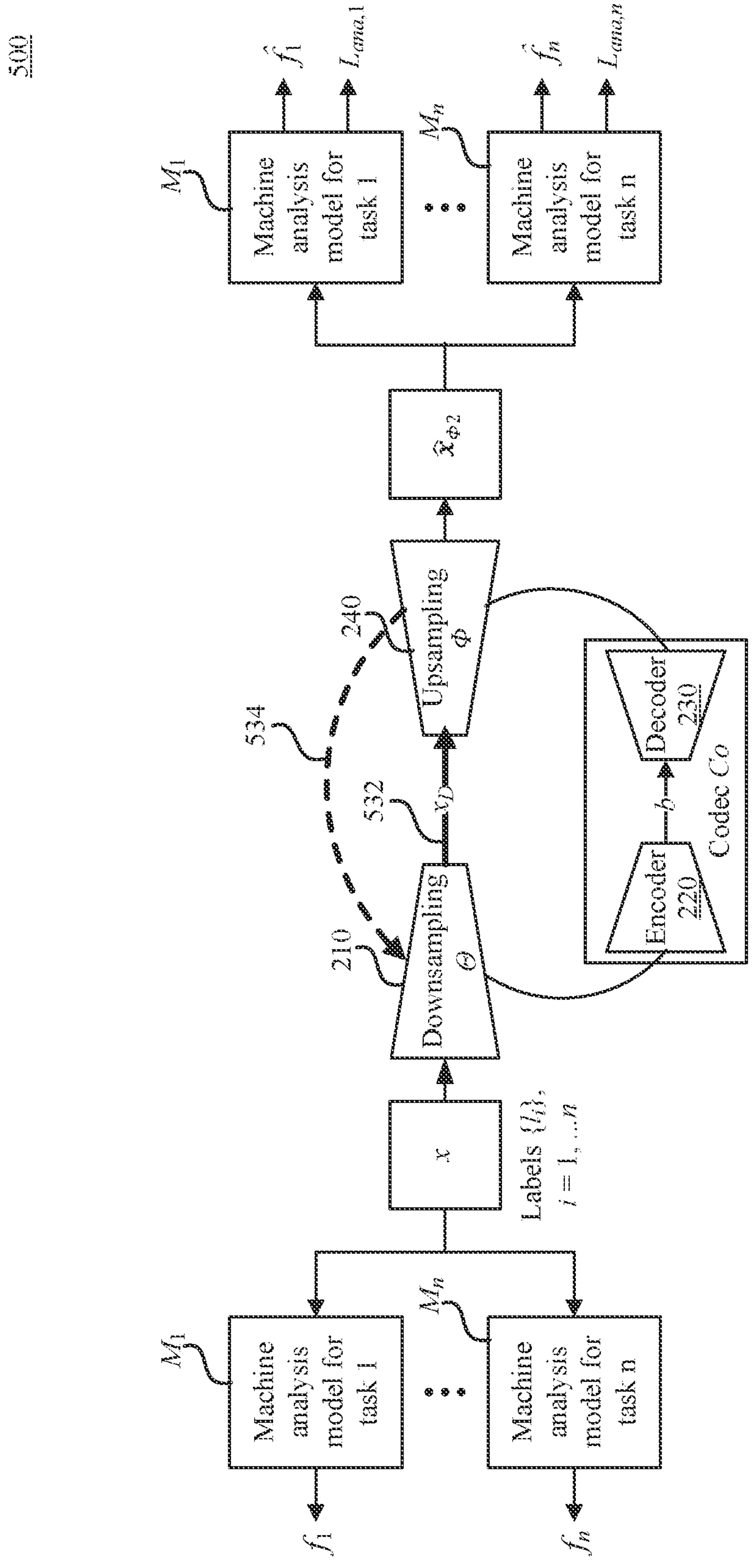
FIG. 5C is a diagram illustrating the exemplary optimization of the down-sampling module for the framework in FIG. 5A, according to some embodiments of the present disclosure.

Reference is made to FIGS. 5A-5C. FIG. 5A is a diagram illustrating another framework 500 for end-to-end optimization of spatial resampling, according to some embodiments of the present disclosure. The framework 500 is accompanied with visual data codec Co in the training stage. In some embodiments, the codec Co used in the testing stage may not be considered in the training stage. In some other embodiments, the visual data codec Co is introduced into the training of spatial resampling to merge the gap between the training stage and the testing stage.

As shown in FIG. 5A, an encoder side 220 of the visual data codec Co performs an encoding process. In the encoding process, an encoder is used to compress the down-sampled image (e.g., the compact image $x_D$) to generate a quantized and compressed bitstream b. Particularly, the compact image $x_D$ generated by the down-sampling module 210 may be fed into an Encoder E (not shown) for the feature extraction and compression. Then, the output data y of the Encoder E is further quantized with a quantizer Q. The quantized output data y' is then transformed as bitstream b by arithmetic encoding AE (not shown). The encoding process above can be formulated as y=E(x),y'=Q(y),b=AE (y') respectively. The bitstream b is transmitted to a decoder side 230 of the visual data codec Co for a decoding process. In the decoding process, a decoder is used to decode the bitstream b to extract general visual information from the bitstream b and generate a reconstructed image data (e.g., a reconstructed compact image $\hat{x}_D$). Particularly, the bitstream b may be first decoded by arithmetic decoding AD (not shown), and then fed into a Decoder D (not shown) to output the reconstructed compact image $\hat{x}_D$.

In some embodiments, an iterative training algorithm is proposed to achieve an end-to-end optimization for the down-sampling module 210 and the up-sampling module 240, given the non-differentiation of visual data codecs. Specifically, each iteration includes two phases for the optimization of the down-sampling module 210 and the up-sampling module 240 respectively.

FIG. 5B is a diagram illustrating the optimization of the up-sampling module 240 in a first phase for the framework 500 in FIG. 5A, according to some embodiments of the present disclosure. In FIG. 5B, the solid line 522, 524 indicate the data and signal processing from the down-sampling module 210, through the visual data codec Co, to the up-sampling module 240, and can be referred to as a "forward path," while the dashed line 526 indicates the data and signal processing from the up-sampling module 240 to the decoder side 230 of the visual data codec Co and can be referred to as a "back-propagation path" for the up-sampling optimization.

In the first phase of the optimization for the up-sampling module 240, the input image x is fed into the down-sampling module 210 to obtain the compact image $x_D$. The compact image $x_D$ is further fed into the visual data codec Co. The visual data codec Co may output a reconstructed compact image $x_D$ to the up-sampling module 240. Accordingly, the up-sampling module 240 may provide an output image $\hat{x}_{\Phi 1}$ after the up-sampling of the reconstructed compact image $x_D$. The up-sampled reconstructed image $\hat{x}_{\Phi 1}$ in the first phase may be denoted as:

$$\hat{x}_{\Phi 1} = U(Co(D(x))),$$

where D denotes the down-sampling operation performed by the down-sampling module 210, Co denotes the codec operations performed by the visual data codec Co, and U denotes the up-sampling operation performed by the up-sampling module 240.

During the training in the first phase, the down-sampling module 210 is kept unchanged while parameters of the up-sampling module 240 are optimized according to a loss function $L_U(x, x_m, \hat{x}_{\Phi 1})$ for up-sampling model optimization.

On the other hand, the optimization of the down-sampling module 210 can be performed in a second phase, which may be either prior to or following the first phase. FIG. 5C is a diagram illustrating the optimization of the down-sampling module 210 in the second phase for the framework 500 in FIG. 5A, according to some embodiments of the present disclosure. In FIG. 5C, the solid line 532 indicates the data and signal processing from the down-sampling module 210 directly to the up-sampling module 240 and can be referred to as a "forward path," while the dashed line 534 indicates the data and signal processing from the up-sampling module 240 directly to the down-sampling module 210 and can be referred to as a "back-propagation path" for the down-sampling optimization. As shown in FIG. 5C, in the second phase, the input image x is fed into the down-sampling module 210 and the up-sampling module 240 subsequently to provide an up-sampled image $\hat{x}_{\Phi 2}$. The up-sampled image $\hat{x}_{\Phi 2}$ in the second phase may be denoted as:

$$\hat{x}_{\Phi 2} = U(D(x)),$$

where D denotes the down-sampling operation performed by the down-sampling module 210, and U denotes the up-sampling operation performed by the up-sampling module 240.

During the training in the second phase, the up-sampling module 240 is kept unchanged while parameters of the down-sampling module 210 are optimized according to a loss function $L_D(x, x_m, \hat{x}_{\Phi 2})$ for down-sampling model optimization. In some embodiments, the loss function $L_D$ for down-sampling model optimization may be the same as the loss function Ly for up-sampling model optimization, but the present disclosure is not limited thereto.

In FIG. 4 and FIGS. 5A-5C, for compact representation of image information, down-sampling the images with small scale tends to achieve lower bitrates but may also lead to information loss. In contrast, for machine vision analysis, such as object detection, performed by machine analysis models $M_1$-$M_n$, the performance could be benefited from the images with large scale as the object feature could be preserved after a cascade of convolutional layers. To balance the bitrates and the machine analysis performance and to improve the overall compression performance, the resampling factor may be selected adaptively based on the proposed end-to-end optimization of spatial resampling towards machine vision discussed above in FIG. 4 and FIGS. 5A-5C.

Specifically, the objects of various images tasks may have different spatial portions or image definitions. For the objects with larger portions, less spatial resampling degradation for machine vision and better compression performance can be achieved. Accordingly, in some embodiments, an instance segmentation process can be performed to the input image data before the down-sampling.

Based on an area of object regions calculated according to the instance segmentation identifying the portion of the extracted parts where the objects are possibly located, the resampling factor can be properly selected from multiple resampling factor candidates for the down-sampling and the up-sampling operations. For example, there may be 4 resampling factor candidates, which are 100%, 75%, 50% and 25%. These resampling factor candidates indicate the ratio of the compressed image to the original image and can be signaled as 00, 01, 10, and 11 respectively. The resampling factor being 100% indicates that the original image is processed without compression. The lower the resampling factor, the more compressed the image is and the less data needs to be transferred over the network. The adaptive resampling factor s for machine vision can be selected using an instance segmentation network. The instance segmentation network is configured to calculate the area of an object's possible regions. An exemplary strategy for the selection of the adaptive resampling factor signal s is as follows:

$$s = \begin{cases} 00 & p \le 0.05 \\ 01 & 0.05 < p \le 0.30 \\ 10 & 0.30 < p \le 0.55 \\ 11 & 0.55 < p \le 1.0 \end{cases}, \text{ if}$$

$$p = S(x)/(WH),$$

where W and H respectively denote the width and height of the input image x, and S(x) denotes the instance segmentation network configured to calculate the area of an object's possible regions to obtain a portion parameter p.

According to the adaptive resampling strategy above, the resampling factor can be selected based on the width and the height of the input image x, and the area of object regions calculated by the instance segmentation network performing the instance segmentation. Thus, the down-sampling module 210 and the up-sampling module 240 may spatially down-sample and up-sample the input image based on different compress ratios according to the area of an object's possible regions. In other words, for a first image with the target object(s) occupying a relatively small fraction of the first image, with the adaptive resampling factor signal s being 01, a greater resampling factor (e.g., 75%) can be adaptively selected and the image is compressed less to avoid undesired spatial resampling degradation for machine vision. For a second image with the target object(s) occupying a relatively large fraction of the first image, with the adaptive resampling factor signal s being 10 or 11, a greater resampling factor (e.g., 50% or 25%) can be adaptively selected to compress the image more, which reduces the data size and achieves better compression performance without resulting significant spatial resampling degradation for machine vision. When the portion parameter p calculated based on the area of object regions is lower than or equal to a threshold value (e.g., 0.05), the down-sampling and the up-sampling may be skipped in response to the resampling factor being 100%. Accordingly, the image is processed without compression, and thus the spatial resampling degradation for machine vision is also avoided.

The above proposed adaptive spatial resampling framework towards machine vision could achieve an end-to-end optimization and be applied with existing visual data codecs in real-world applications. The proposed framework could preserve the machine vision-oriented information and is applicable to various machine analysis tasks. Moreover, except for image compression, the proposed spatial resampling could also be applied to video compression and combined with temporal resampling in time domain.

Figure 6A:
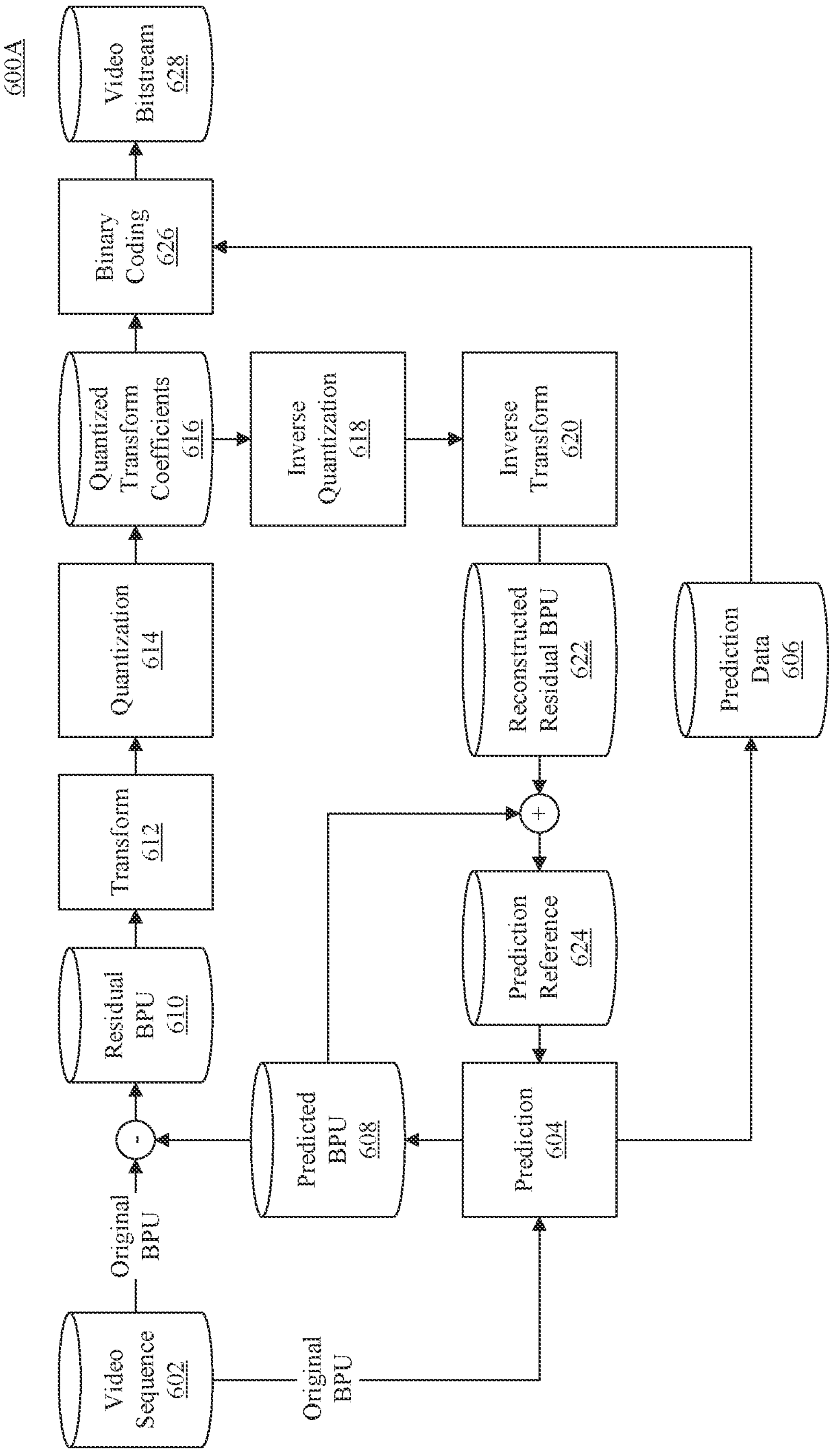
FIG. 6A is a diagram illustrating an exemplary video encoding process, according to some embodiments of the present disclosure.

Image or video coding performed by the visual data codec Co in FIGS. 5A-5C may include multiple stages of operations, examples of which are shown in FIGS. 6A-6B and FIGS. 7A-7B. FIG. 6A shows a schematic of an example video encoding process, according to some embodiments of the present disclosure. For example, encoding process 600A shown in FIG. 6A can be performed by an encoder (e.g., encoder side 220 in FIGS. 5A-5C). As shown in FIG. 6A, the encoder can encode video sequence 602 into video bitstream 628 according to encoding process 600A. Video sequence 602 can include a set of pictures (referred to as "original pictures") arranged in a temporal order. Each original picture of video sequence 602 can be divided by the encoder into basic processing units, basic processing sub-units, or regions for processing. In some embodiments, the encoder can perform process 600A at the level of basic processing units for each original picture of video sequence 602. For example, the encoder can perform process 600A in an iterative manner, in which the encoder can encode a basic processing unit in one iteration of process 600A. In some embodiments, the encoder can perform process 600A in parallel for regions of each original picture of video sequence 602.

In FIG. 6A, the encoder can feed a basic processing unit (referred to as an "original BPU") of an original picture of video sequence 602 to prediction stage 604 to generate prediction data 606 and predicted BPU 608. The encoder can subtract predicted BPU 608 from the original BPU to generate residual BPU 610. The encoder can feed residual BPU 610 to transform stage 612 and quantization stage 614 to generate quantized transform coefficients 616. The encoder can feed prediction data 606 and quantized transform coefficients 616 to binary coding stage 626 to generate video bitstream 628. Components 602, 604, 606, 608, 610, 612, 614, 616, 626, and 628 can be referred to as a "forward path." During process 600A, after quantization stage 614, the encoder can feed quantized transform coefficients 616 to inverse quantization stage 618 and inverse transform stage 620 to generate reconstructed residual BPU 622. The encoder can add reconstructed residual BPU 622 to predicted BPU 608 to generate prediction reference 624, which is used in prediction stage 604 for the next iteration of process 600A. Components 618, 620, 622, and 624 of process 600A can be referred to as a "reconstruction path." The reconstruction path can be used to ensure that both the encoder and the decoder use the same reference data for prediction.

The encoder can perform process 600A iteratively to encode each original BPU of the original picture (in the forward path) and generate prediction reference 624 for encoding the next original BPU of the original picture (in the reconstruction path). After encoding all original BPUs of the original picture, the encoder can proceed to encode the next picture in video sequence 602.

Referring to process 600A, the encoder can receive video sequence 602 generated by a video capturing device (e.g., a camera). The term "receive" used herein can refer to receiving, inputting, acquiring, retrieving, obtaining, reading, accessing, or any action in any manner for inputting data.

At prediction stage 604, at a current iteration, the encoder can receive an original BPU and prediction reference 624, and perform a prediction operation to generate prediction data 606 and predicted BPU 608. Prediction reference 624 can be generated from the reconstruction path of the previous iteration of process 600A. The purpose of prediction stage 604 is to reduce information redundancy by extracting prediction data 606 that can be used to reconstruct the original BPU as predicted BPU 608 from prediction data 606 and prediction reference 624.

Ideally, predicted BPU 608 can be identical to the original BPU. However, due to non-ideal prediction and reconstruction operations, predicted BPU 608 is generally slightly different from the original BPU. For recording such differences, after generating predicted BPU 608, the encoder can subtract it from the original BPU to generate residual BPU 610. For example, the encoder can subtract values (e.g., greyscale values or RGB values) of pixels of predicted BPU 608 from values of corresponding pixels of the original BPU. Each pixel of residual BPU 610 can have a residual value as a result of such subtraction between the corresponding pixels of the original BPU and predicted BPU 608. Compared with the original BPU, prediction data 606 and residual BPU 610 can have fewer bits, but they can be used to reconstruct the original BPU without significant quality deterioration. Thus, the original BPU is compressed.

To further compress residual BPU 610, at transform stage 612, the encoder can reduce spatial redundancy of residual BPU 610 by decomposing it into a set of two-dimensional "base patterns," each base pattern being associated with a "transform coefficient." The base patterns can have the same size (e.g., the size of residual BPU 610). Each base pattern can represent a variation frequency (e.g., frequency of brightness variation) component of residual BPU 610. None of the base patterns can be reproduced from any combinations (e.g., linear combinations) of any other base patterns. In other words, the decomposition can decompose variations of residual BPU 610 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 612, such as, for example, a discrete cosine transform, a discrete sine transform, or the like. The transform at transform stage 612 is invertible. That is, the encoder can restore residual BPU 610 by an inverse operation of the transform (referred to as an "inverse transform"). For example, to restore a pixel of residual BPU 610, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 610 without receiving the base patterns from the encoder. Compared with residual BPU 610, the transform coefficients can have fewer bits, but they can be used to reconstruct residual BPU 610 without significant quality deterioration. Thus, residual BPU 610 is further compressed.

The encoder can further compress the transform coefficients at quantization stage 614. In the transform process, different base patterns can represent different variation frequencies (e.g., brightness variation frequencies). For example, at quantization stage 614, the encoder can generate quantized transform coefficients 616 by dividing each transform coefficient by an integer value (referred to as a "quantization parameter") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 616, by which the transform coefficients are further compressed. The quantization process is also invertible, in which quantized transform coefficients 616 can be reconstructed to the transform coefficients in an inverse operation of the quantization (referred to as "inverse quantization").

Because the encoder disregards the remainders of such divisions in the rounding operation, quantization stage 614 can be lossy. Typically, quantization stage 614 can contribute the most information loss in process 600A. The larger the information loss is, the fewer bits the quantized transform coefficients 616 can be fed. For obtaining different levels of information loss, the encoder can use different values of the quantization parameter or any other parameter of the quantization process.

At binary coding stage 626, the encoder can encode prediction data 606 and quantized transform coefficients 616 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 606 and quantized transform coefficients 616, the encoder can encode other information at binary coding stage 626, such as, for example, a prediction mode used at prediction stage 604, parameters of the prediction operation, a transform type at transform stage 612, parameters of the quantization process (e.g., quantization parameters), an encoder control parameter (e.g., a bitrate control parameter), or the like. The encoder can use the output data of binary coding stage 626 to generate video bitstream 628. In some embodiments, video bitstream 628 can be further packetized for network transmission.

Referring to the reconstruction path of process 600A, at inverse quantization stage 618, the encoder can perform inverse quantization on quantized transform coefficients 616 to generate reconstructed transform coefficients. At inverse transform stage 620, the encoder can generate reconstructed residual BPU 622 based on the reconstructed transform coefficients. The encoder can add reconstructed residual BPU 622 to predicted BPU 608 to generate prediction reference 624 that is to be used in the next iteration of process 600A.

It should be noted that other variations of the process 600A can be used to encode video sequence 602. In some embodiments, stages of process 600A can be performed by the encoder in different orders. In some embodiments, one or more stages of process 600A can be combined into a single stage. In some embodiments, a single stage of process 600A can be divided into multiple stages. For example, transform stage 612 and quantization stage 614 can be combined into a single stage. In some embodiments, process 600A can include additional stages. In some embodiments, process 600A can omit one or more stages in FIG. 6A.

Figure 6B:
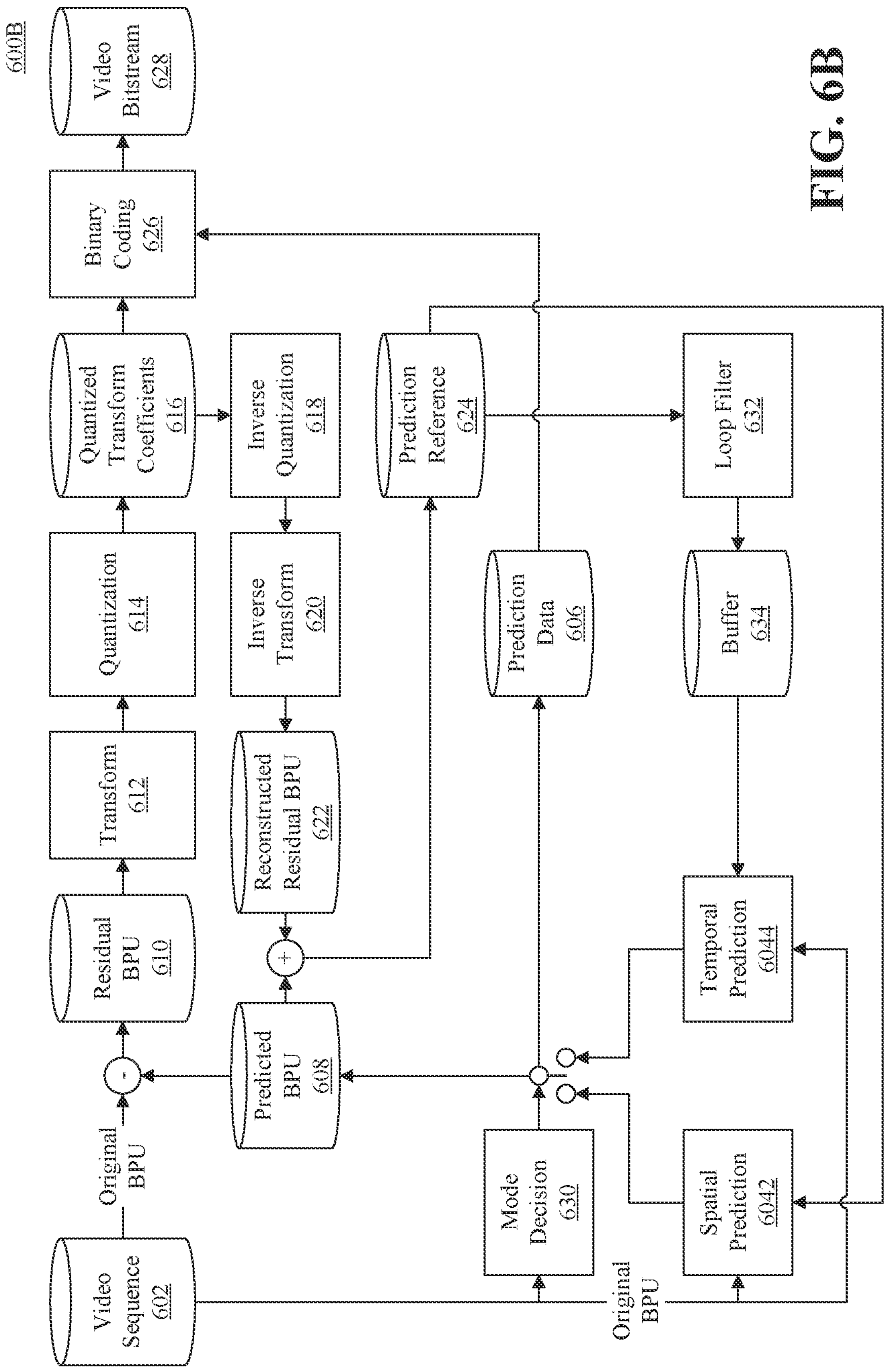
FIG. 6B is a diagram illustrating another an exemplary encoding process, according to some embodiments of the present disclosure.

FIG. 6B shows a schematic of another example encoding process, according to some embodiments of the present disclosure. As shown in FIG. 6B, process 600B can be modified from process 600A. For example, process 600B can be used by an encoder conforming to a hybrid video coding standard (e.g., H.26x series). Compared with process 600A, the forward path of process 600B additionally includes mode decision stage 630 and divides prediction stage 604 into spatial prediction stage 6042 and temporal prediction stage 6044. The reconstruction path of process 600B additionally includes loop filter stage 632 and buffer 634.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 624 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 624 in the temporal prediction can include the coded pictures. The temporal prediction can reduce the inherent temporal redundancy of the pictures.

Referring to process 600B, in the forward path, the encoder performs the prediction operation at spatial prediction stage 6042 and temporal prediction stage 6044. For example, at spatial prediction stage 6042, the encoder can perform the intra prediction. For an original BPU of a picture being encoded, prediction reference 624 can include one or more neighboring BPUs that have been encoded (in the forward path) and reconstructed (in the reconstructed path) in the same picture. The encoder can generate predicted BPU 608 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 608. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 606 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 6044, the encoder can perform the inter prediction. For an original BPU of a current picture, prediction reference 624 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 622 to predicted BPU 608 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline, it can be deemed that the matching region "moves" to the location of the original BPU as time goes by. The encoder can record the direction and distance of such a motion as a "motion vector." When multiple reference pictures are used, the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 606 can include, for example, locations (e.g., coordinates) of the matching region, the motion vectors associated with the matching region, the number of reference pictures, weights associated with the reference pictures, or the like.

For generating predicted BPU 608, the encoder can perform an operation of "motion compensation." The motion compensation can be used to reconstruct predicted BPU 608 based on prediction data 606 (e.g., the motion vector) and prediction reference 624. For example, the encoder can move the matching region of the reference picture according to the motion vector, in which the encoder can predict the original BPU of the current picture. When multiple reference pictures are used, the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, for a picture being a unidirectional inter-predicted picture, the reference picture precedes the picture. Bidirectional inter predictions can use one or more reference pictures at both temporal directions with respect to the current picture. For example, for a picture being a bidirectional inter-predicted picture, the reference pictures are at both temporal directions with respect to the picture.

Still referring to the forward path of process 600B, after spatial prediction stage 6042 and temporal prediction stage 6044, at mode decision stage 630, the encoder can select a prediction mode (e.g., one of the intra prediction or the inter prediction) for the current iteration of process 600B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 608 and prediction data 606.

In the reconstruction path of process 600B, if intra prediction mode has been selected in the forward path, after generating prediction reference 624 (e.g., the current BPU that has been encoded and reconstructed in the current picture), the encoder can directly feed prediction reference 624 to spatial prediction stage 6042 for later usage (e.g., for extrapolation of a next BPU of the current picture). If the inter prediction mode has been selected in the forward path, after generating prediction reference 624 (e.g., the current picture in which all BPUs have been encoded and reconstructed), the encoder can feed prediction reference 624 to loop filter stage 632, at which the encoder can apply a loop filter to prediction reference 624 to reduce or eliminate distortion (e.g., blocking artifacts) introduced by the inter prediction. The encoder can apply various loop filter techniques at loop filter stage 632, such as, for example, deblocking, sample adaptive offsets, adaptive loop filters, or the like. The loop-filtered reference picture can be stored in buffer 634 (or "decoded picture buffer") for later use (e.g., to be used as an inter-prediction reference picture for a future picture of video sequence 602). The encoder can store one or more reference pictures in buffer 634 to be used at temporal prediction stage 6044. In some embodiments, the encoder can encode parameters of the loop filter (e.g., a loop filter strength) at binary coding stage 626, along with quantized transform coefficients 616, prediction data 606, and other information.

Figure 7A:
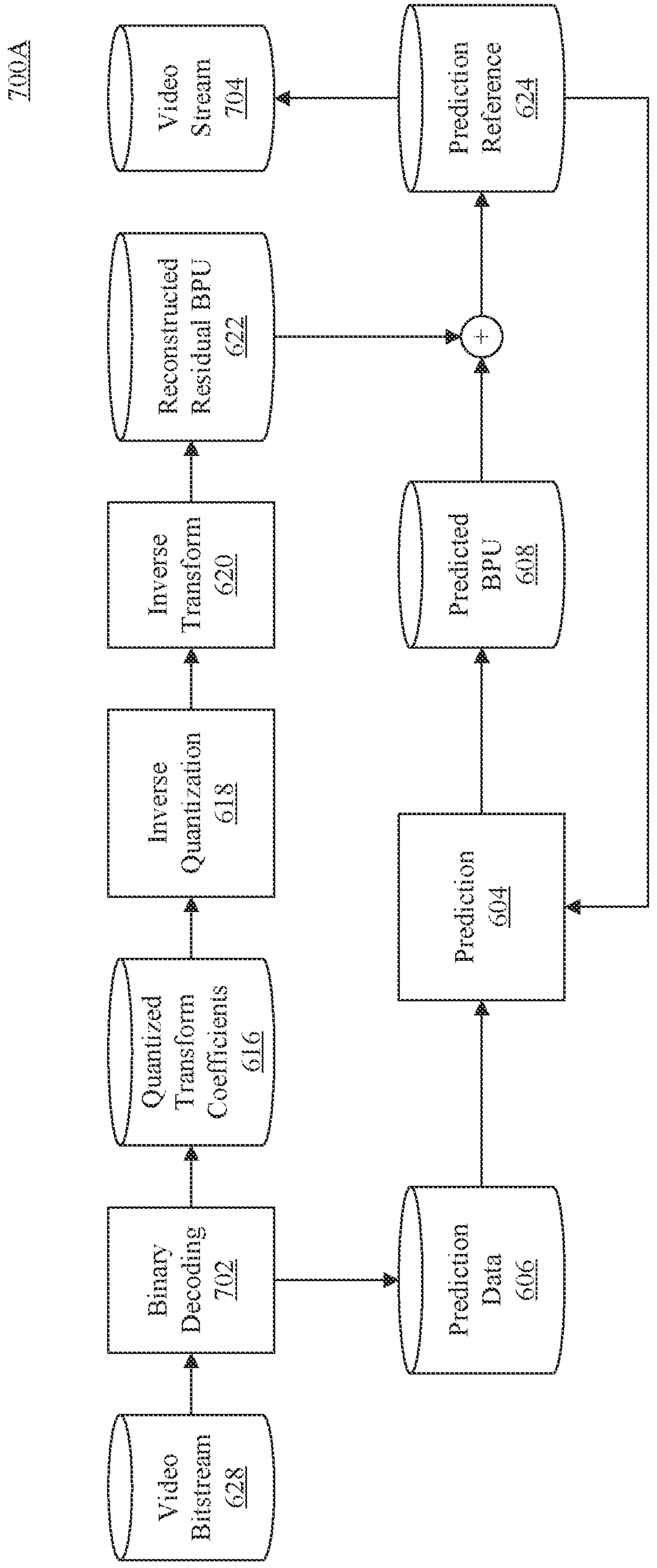
FIG. 7A is a diagram illustrating an exemplary decoding process, according to some embodiments of the present disclosure.

FIG. 7A shows a schematic of an example decoding process, according to some embodiments of the present disclosure. As shown in FIG. 7A, process 700A can be a decompression process corresponding to the encoding process 600A in FIG. 6A. In some embodiments, process 700A can be similar to the reconstruction path of process 600A. A decoder can decode video bitstream 628 into video stream 704 according to process 700A. Video stream 704 can be very similar to video sequence 602. However, due to the information loss in the compression and decompression process (e.g., quantization stage 614 in FIGS. 6A-6B), generally, video stream 704 may not be identical to video sequence 602. Similar to processes 600A and 600B in FIGS. 6A-6B, the decoder can perform process 700A at the level of basic processing units (BPUs) for each picture encoded in video bitstream 628. For example, the decoder can perform process 700A in an iterative manner, in which the decoder can decode a basic processing unit in one iteration of process 700A. In some embodiments, the decoder can perform process 700A in parallel for regions of each picture encoded in video bitstream 628.

In FIG. 7A, the decoder can feed a portion of video bitstream 628 associated with a basic processing unit (referred to as an "encoded BPU") of an encoded picture to binary decoding stage 702. At binary decoding stage 702, the decoder can decode the portion into prediction data 606 and quantized transform coefficients 616. The decoder can feed quantized transform coefficients 616 to inverse quantization stage 618 and inverse transform stage 620 to generate reconstructed residual BPU 622. The decoder can feed prediction data 606 to prediction stage 604 to generate predicted BPU 608. The decoder can add reconstructed residual BPU 622 to predicted BPU 608 to generate prediction reference 624. In some embodiments, prediction reference 624 can be stored in a buffer (e.g., a decoded picture buffer in a computer memory). The decoder can feed prediction reference 624 to prediction stage 604 for performing a prediction operation in the next iteration of process 700A.

The decoder can perform process 700A iteratively to decode each encoded BPU of the encoded picture and generate prediction reference 624 for encoding the next encoded BPU of the encoded picture. After decoding all encoded BPUs of the encoded picture, the decoder can output the picture to video stream 704 for display and proceed to decode the next encoded picture in video bitstream 628.

At binary decoding stage 702, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 606 and quantized transform coefficients 616, the decoder can decode other information at binary decoding stage 702, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 628 is transmitted over a network in packets, the decoder can depacketize video bitstream 628 before feeding it to binary decoding stage 702.

Figure 7B:
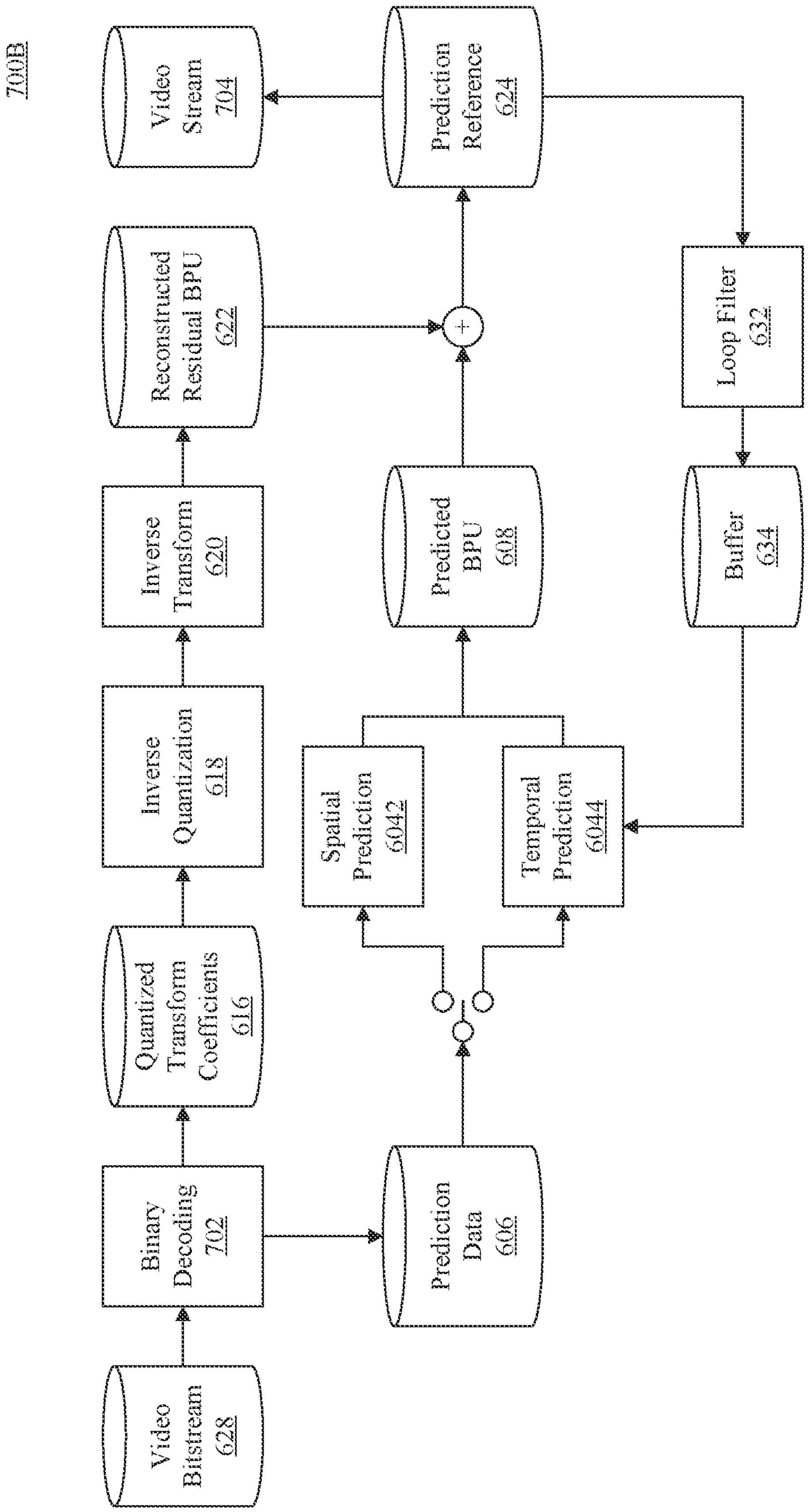
FIG. 7B is a diagram illustrating another an exemplary decoding process, according to some embodiments of the present disclosure.

FIG. 7B shows a schematic of another example decoding process, according to some embodiments of the present disclosure. As shown in FIG. 7B, process 700B can be modified from process 700A. For example, process 700B can be used by a decoder conforming to a hybrid video coding standard (e.g., H.26x series). Compared with process 700A, process 700B additionally divides prediction stage 604 into spatial prediction stage 6042 and temporal prediction stage 6044, and additionally includes loop filter stage 632 and buffer 634.

In process 700B, for an encoded basic processing unit (referred to as a "current BPU") of an encoded picture (referred to as a "current picture") that is being decoded, prediction data 606 decoded from binary decoding stage 702 by the decoder can include various types of data, depending on what prediction mode was used to encode the current BPU by the encoder. For example, if intra prediction was used by the encoder to encode the current BPU, prediction data 606 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 606 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 6042 or a temporal prediction (e.g., the inter prediction) at temporal prediction stage 6044. The details of performing such spatial prediction or temporal prediction are described in FIG. 6B and will not be repeated hereinafter. After performing such spatial prediction or temporal prediction, the decoder can generate predicted BPU 608. The decoder can add predicted BPU 608 and reconstructed residual BPU 622 to generate prediction reference 624, as described in FIG. 7A.

In process 700B, the decoder can feed prediction reference 624 to spatial prediction stage 6042 or temporal prediction stage 6044 for performing a prediction operation in the next iteration of process 700B. For example, if the current BPU is decoded using the intra prediction at spatial prediction stage 6042, after generating prediction reference 624 (e.g., the decoded current BPU), the decoder can directly feed prediction reference 624 to spatial prediction stage 6042 for later usage (e.g., for extrapolation of a next BPU of the current picture). If the current BPU is decoded using the inter prediction at temporal prediction stage 6044, after generating prediction reference 624 (e.g., a reference picture in which all BPUs have been decoded), the encoder can feed prediction reference 624 to loop filter stage 632 to reduce or eliminate distortion (e.g., blocking artifacts). The decoder can apply a loop filter to prediction reference 624, in a way as described in FIG. 6B. The loop-filtered reference picture can be stored in buffer 634 (e.g., a decoded picture buffer in a computer memory) for later use (e.g., to be used as an inter-prediction reference picture for a future encoded picture of video bitstream 628). The decoder can store one or more reference pictures in buffer 634 to be used at temporal prediction stage 6044. In some embodiments, when the prediction mode indicator of prediction data 606 indicates that inter prediction was used to encode the current BPU, prediction data can further include parameters of the loop filter (e.g., a loop filter strength).

There can be four types of loop filters. For example, the loop filters can include a deblocking filter, a sample adaptive offsets ("SAO") filter, a luma mapping with chroma scaling ("LMCS") filter, and an adaptive loop filter ("ALF"). The order of applying the four types of loop filters can be the LMCS filter, the deblocking filter, the SAO filter, and the ALF. The LMCS filter can include two main components. The first component can be an in-loop mapping of the luma component based on adaptive piecewise linear models. The second component can be for the chroma components, and luma-dependent chroma residual scaling can be applied.

Figure 8:
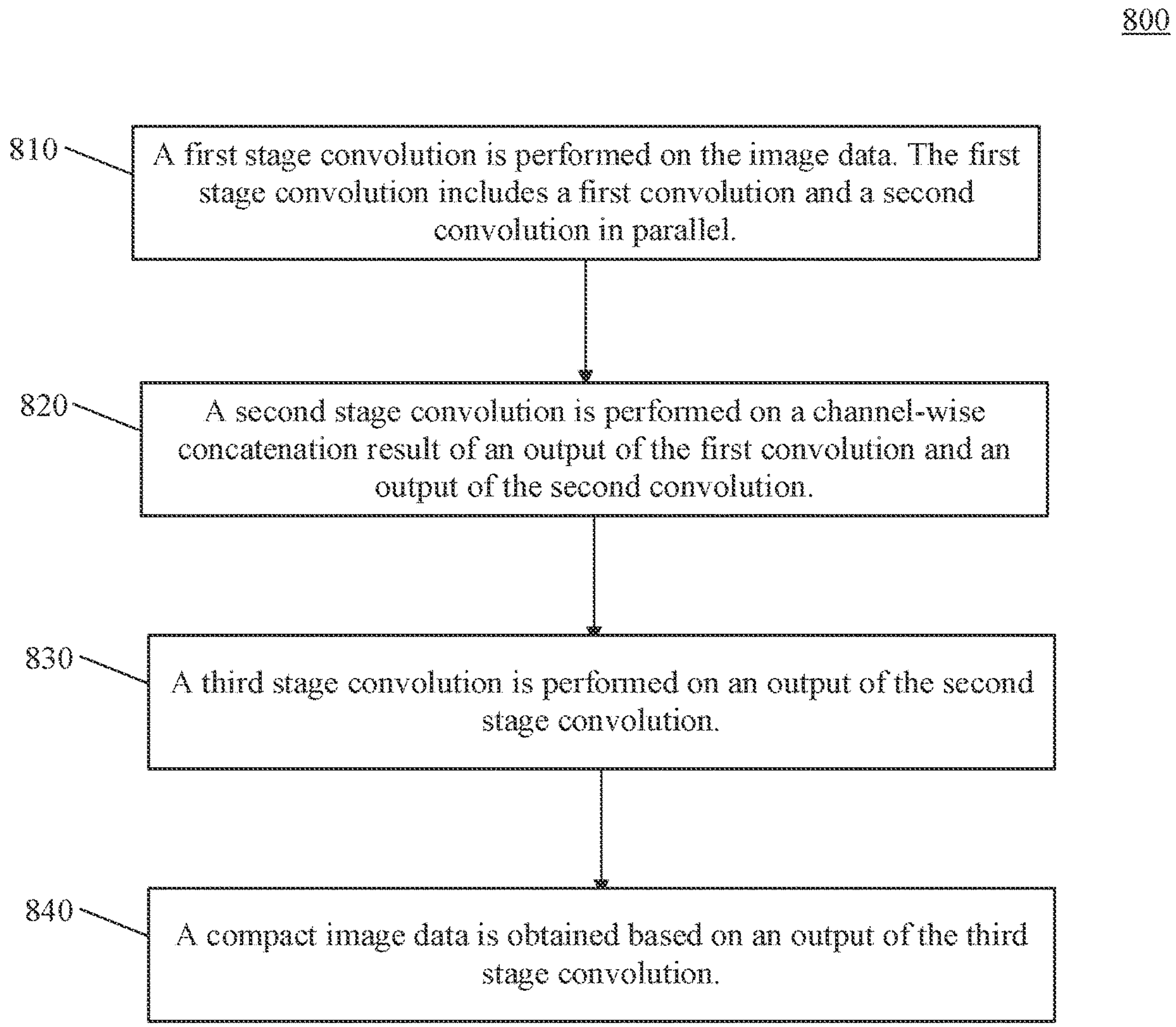
FIG. 8 is a flowchart diagram of an exemplary computer-implemented method for down-sampling on an image data in YUV format, according to some embodiments of the present disclosure.

FIG. 8 is a flowchart diagram of an exemplary computer-implemented method 800 for down-sampling on an image data in YUV format, consistent with some embodiments of the present disclosure. For example, method 800 can be performed or implemented by software stored in a machine learning device or system. As shown in FIG. 8, in some embodiments, method 800 includes steps 810 to 840, which will be discussed in the following paragraphs.

In step 810, a first stage convolution is performed on the image data. The first stage convolution includes a first convolution and a second convolution in parallel. In some embodiments, the first convolution is performed on a Y component of the image data by a first convolutional layer (e.g., convolutional layer 310 in FIG. 3A), and the second convolution is performed on a channel-wise concatenation result of a U component and a V component of the image data by a second convolutional layer (e.g., convolutional layer 312 in FIG. 3A).

In step 820, a second stage convolution is performed on a channel-wise concatenation result of an output of the first convolution and an output of the second convolution. In some embodiments, a second channel-wise concatenation is performed to the output of the first convolutional layer and the output of the second convolutional layer, and the second convolution is performed on the concatenation result by a third convolutional layer (e.g., convolutional layer 314 in FIG. 3A).

In step 830, a third stage convolution is performed on an output of the second stage convolution. In some embodiments, a fourth convolution is performed on the output of the third convolution by a fourth convolutional layer (e.g., convolutional layer 316 in FIG. 3A), and a fifth convolution is performed on the output of the third convolution by a fifth convolutional layer (e.g., convolutional layer 318 in FIG. 3A). The four convolution and the fifth convolution are in parallel.

In step 840, a compact image data is obtained based on an output of the third stage convolution. In some embodiments, a Y component of the compact image is obtained based on an output of the fourth convolution, and a channel-wise concatenation result of a U component and a V component of the compact image data is obtained based on an output of the fifth convolution. Therefore, a down-sampling on image data in YUV format for machines is realised.

In some embodiments, a set of parameters of each of the plurality of convolutions may include an input channel number Cin, an output channel number Cout, a kernel size k, a stride s, and a padding size p. The set of parameters is determined based on a type of a YUV format and a number of the plurality of convolutions. In some embodiments, ReLU is applied to the convolutional layer as the activation function.

In this example, a three stage of convolution is performed on the YUV, and the second stage convolution includes one convolution. In some embodiments, the second stage convolution includes a plurality of convolutions with different parameters.

Figure 9:
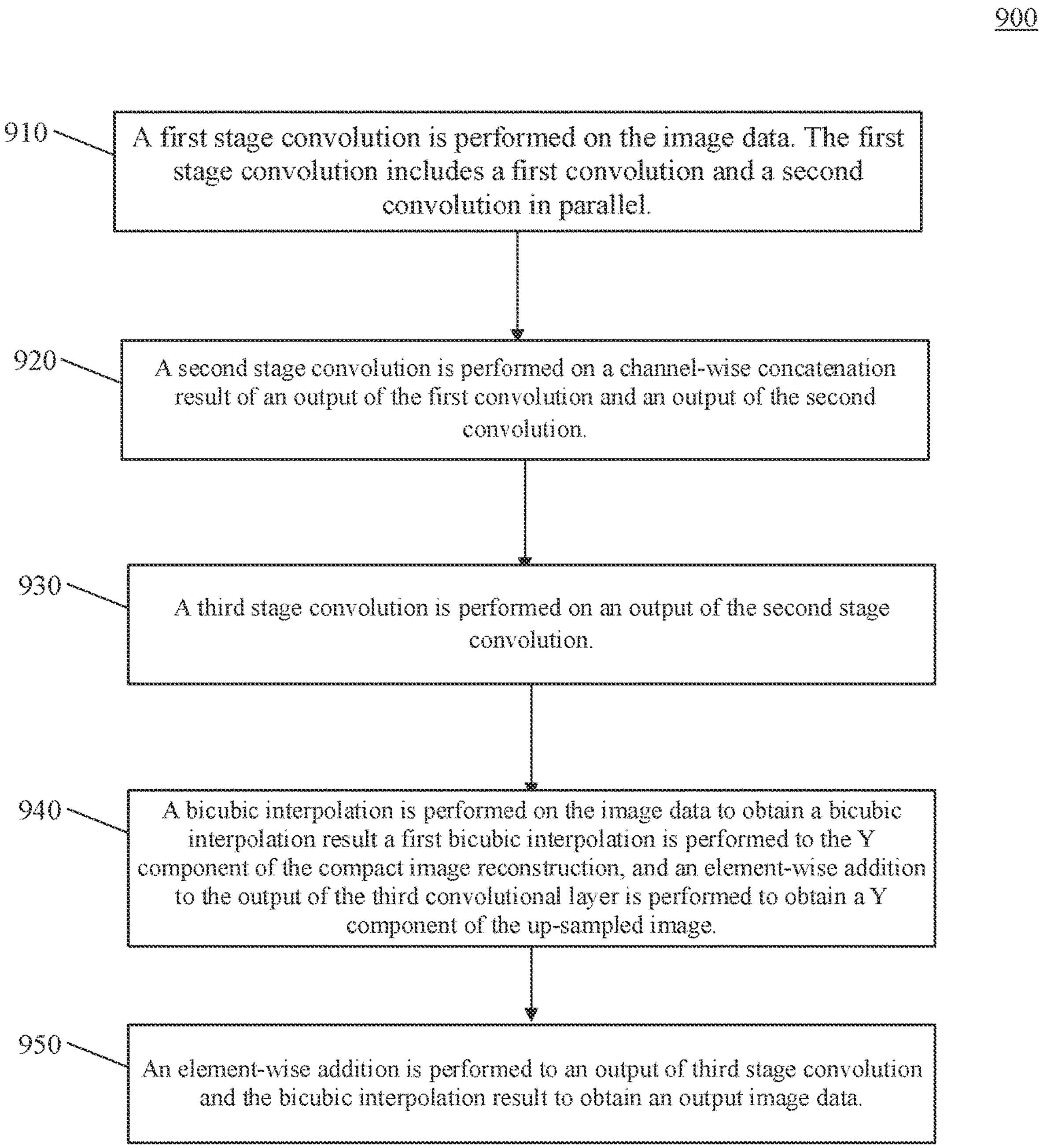
FIG. 9 is a flowchart diagram of an exemplary computer-implemented method for up-sampling on an image data in YUV format, according to some embodiments of the present disclosure.

FIG. 9 is a flowchart diagram of an exemplary computer-implemented method 900 for up-sampling on image data in YUV format, consistent with some embodiments of the present disclosure. For example, method 900 can be performed or implemented by software stored in a machine learning device or system. As shown in FIG. 9, in some embodiments, method 900 includes steps 910 to 950, which will be discussed in the following paragraphs.

In step 910, a first stage convolution is performed on the image data. The first stage convolution includes a first convolution and a second convolution in parallel. The image data may be a compact image reconstruction data. In some embodiments, the first convolution is performed on a Y component of the image data by a first convolutional layer (e.g., convolutional layer 320 in FIG. 3B), and the second convolution is performed on a channel-wise concatenation result of a U component and a V component of the image data by a second convolutional layer (e.g., convolutional layer 322 in FIG. 3B). In some embodiments, the second convolution is a transposed convolution.

In step 920, a second stage convolution is performed on a channel-wise concatenation result of an output of the first convolution and an output of the second convolution. In some embodiments, the second stage convolution includes a series of convolutions, for example, the number of the series of convolutions is 15 to 25, in some embodiments, the second stage convolution includes 18 convolutions in series, bylayers (e.g., convolutional layers 324*a*-324*n* in FIG. 3B).

In step 930, a third stage convolution is performed on an output of the second stage convolution. In some embodiments, a fourth convolution is performed on the output of the third convolution by a convolutional layer (e.g., convolutional layer 326 in FIG. 3B), and a fifth convolution is performed on the output of the third convolution by a fourth convolutional layer (e.g., convolutional layer 328 in FIG. 3B). The four convolution and the fifth convolution are performed in parallel. In some embodiments, the fourth convolution is a transposed convolution.

In step 940, a bicubic interpolation is performed on the image data to obtain a bicubic interpolation result a first bicubic interpolation is performed to the Y component of the compact image reconstruction, and an element-wise addition to the output of the third convolutional layer is performed to obtain a Y component of the up-sampled image.

In step 950, an element-wise addition is performed to an output of third stage convolution and the bicubic interpolation result to obtain an output image data. In some embodiments, a first element-wise addition is performed to an output of the fourth convolution and a first bicubic interpolation result of a Y component of the image data to obtain a Y component of the output image data, and a second element-wise addition is performed to an output of the fifth convolution and a second bicubic interpolation result of the channel-wise concatenation result of the U component and the V component of the image data to obtain a channel-wise concatenation result of a U component and a V component of the output image data. Therefore, an up-sampling on image data in YUV format for machines is realised.

In some embodiments, a set of parameters of each of the plurality of convolutions may include an input channel number Cin, an output channel number Cout, a kernel size k, a stride s, and a padding size p. The set of parameters is determined based on a type of a YUV format and a number of the plurality of convolutions. In some embodiments, ReLU is applied to the convolutional layer as the activation function.

In some embodiments, ReLU is applied to each convolution in the first stage convolution (e.g., convolutional layers 320, 322 in FIG. 3B) and the second stage convolution (e.g., convolutional layers 324*a*-324*n* in FIG. 3B) as an activation function. There is an activation function applied on the third stage convolution (e.g., convolutional layers 326, 328 in FIG. 3B)

Figure 10:
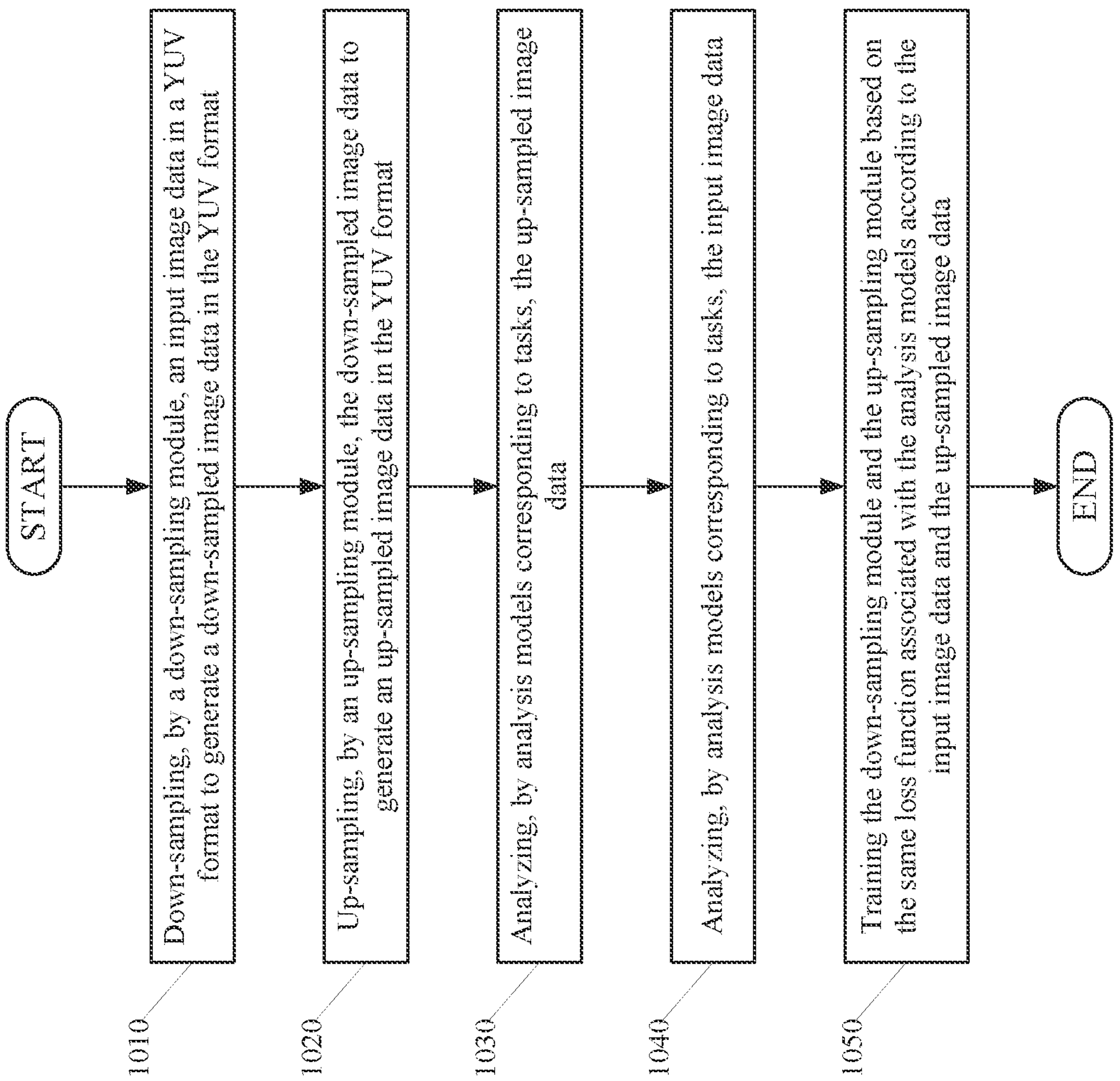
FIGS. 10-11 are flowchart diagrams of exemplary computer-implemented methods for training spatial resampling modules, according to some embodiments of the present disclosure.

FIG. 10 is a flowchart diagram of an exemplary computer-implemented method 1000 for training spatial resampling modules, consistent with some embodiments of the present disclosure. For example, method 1000 can be performed or implemented by software stored in a machine learning device or system. As shown in FIG. 10, in some embodiments, method 1000 includes steps 1010-1050, which will be discussed in the following paragraphs.

In step 1010, a down-sampling module (e.g., down-sampling module 210 in FIG. 2) is configured to down-sample an input image data in a YUV format (e.g., input image x in FIG. 2) to generate a down-sampled image data (e.g., compact image $x_D$ in FIG. 2) in the YUV format.

In step 1020, an up-sampling module (e.g., up-sampling module 240 in FIG. 2) is configured to receive the down-sampled image data from the down-sampling module, and to up-sample the down-sampled image data to generate a first up-sampled image data (e.g., up-sampled image $\hat{x}_\Phi$ in FIG. 2) in the YUV format.

In step 1030, multiple analysis models (e.g., machine analysis models $M_1$-$M_n$ in FIG. 2) corresponding to multiple tasks are configured to analyze the first up-sampled image data. The analysis models may be pre-trained to perform certain machine vision tasks, such as object detection, object recognition, object classification, distance or depth estimation, pattern matching, shape evaluation, etc. In some embodiments, for each analysis model, a corresponding feature map (e.g., feature maps $\hat{f}_1$-$\hat{f}_n$ in FIG. 4) may be extracted based on the first up-sampled image data.

In step 1040, multiple analysis models corresponding to multiple tasks are configured to analyze the input image data. Similarly, in some embodiments, for each analysis model, a corresponding feature map (e.g., feature maps $f_1$-$f_n$ in FIG. 4) may be extracted based on the input image data.

In step 1050, the down-sampling module and the up-sampling module are trained based on the same loss function associated with the analysis models according to the input image data and the first up-sampled image data. For example, the loss function may include a contour loss function associated with object contours, feature map distortions respectively associated with the analysis models, analysis loss functions respectively associated with the analysis models, or any combinations thereof. Each feature map distortion can be calculated and obtained based on extracted feature maps of the corresponding analysis model obtained in steps 830 and 840. Each machine analysis loss function corresponding to specific machine analysis task may follow the definition of the analysis model.

Accordingly, the loss function quantifies the difference between the expected outcome, which may be obtained using the original image data, and the outcome produced using the image data after the down-sampling and up-sampling process. From the loss function, the down-sampling module and the up-sampling module can be respectively trained and optimized by updating corresponding weights.

Figure 11:
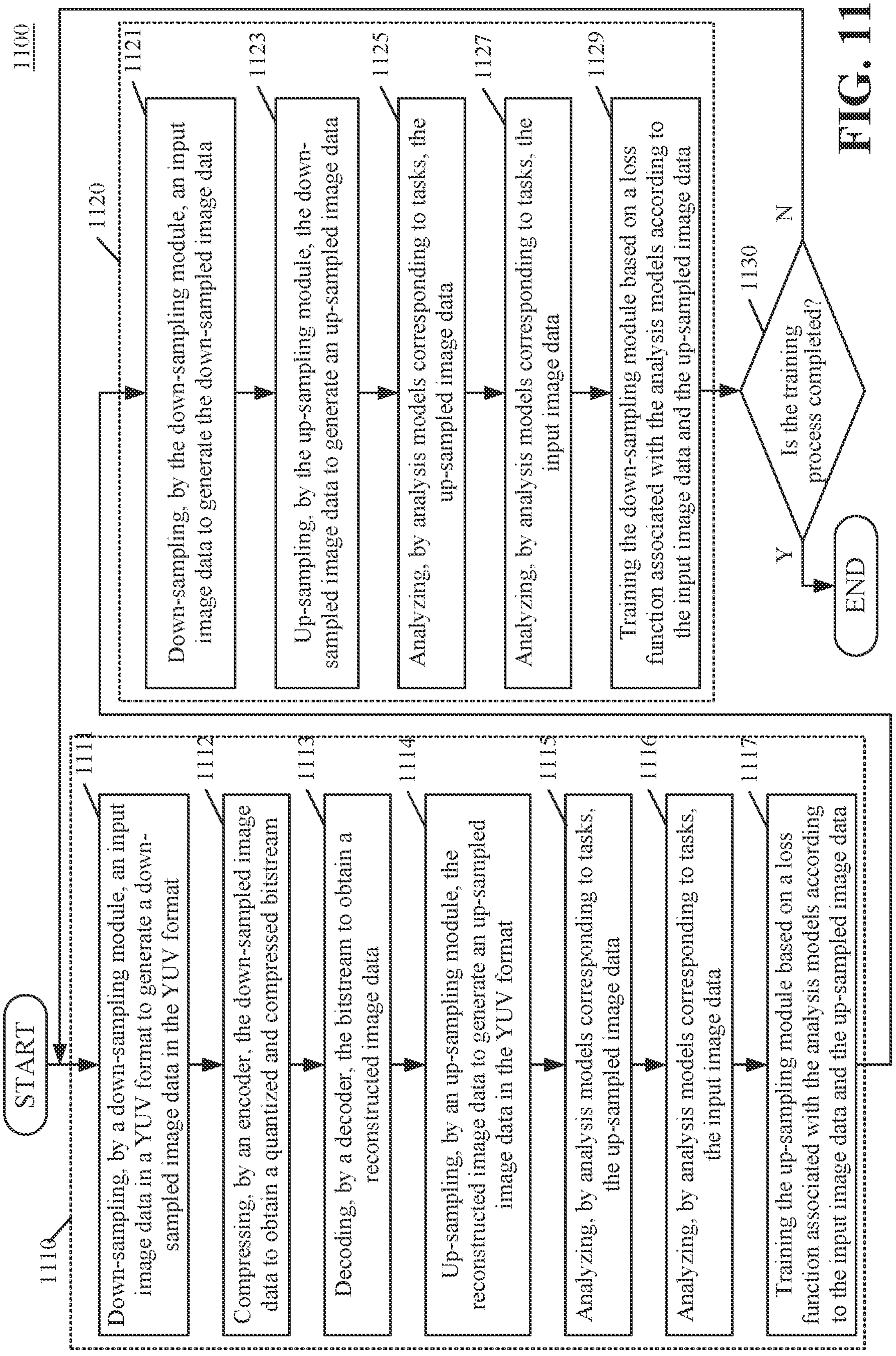

FIG. 11 is a flowchart diagram of another exemplary computer-implemented method 1100 for training spatial resampling modules, according to some embodiments of the present disclosure. Similar to the method 1000 in FIG. 10, the method 1100 can be performed or implemented by software stored in a machine learning device or system. Compared to the method 1000, in the method 1100, each iteration includes two phases 1110 and 1120 for the optimization of the up-sampling module and the down-sampling module respectively.

In a phase 1110 for optimizing the up-sampling module, the down-sampling module remains unchanged. The phase 1110 includes steps 1111-1117. Particularly, in step 1111, a down-sampling module (e.g., down-sampling module 210 in FIGS. 5A-5C) is configured to down-sample an input image data (e.g., input image x in FIGS. 5A-5C) in a YUV format to generate a down-sampled image data (e.g., compact image $x_D$ in FIGS. 5A-5C) in the YUV format. In step 1112, an encoder (e.g., encoder side 220 in FIGS. 5A-5C) is configured to receive the down-sampled image data and compress the received down-sampled image data to obtain a quantized and compressed bitstream (e.g., bitstream b in FIGS. 5A-5C). In step 1113, a decoder (e.g., decoder side 230 in FIGS. 5A-5C) is configured to receive and decode the bitstream to obtain a reconstructed image data (e.g., reconstructed compact image $\hat{x}_D$ in FIG. 5B) in the YUV format. In step 1114, the up-sampling module is configured to up-sample the reconstructed image data to generate an up-sampled image data (e.g., up-sampled reconstructed image $\hat{x}_{\Phi 1}$ in FIG. 5B) in the YUV format.

Operations of steps 1115-1117 are similar to steps 1030-1050 described above. In step 1115, multiple analysis models (e.g., machine analysis models $M_1$-$M_n$ in FIG. 5B) corresponding to multiple tasks are configured to analyze the up-sampled image data and extract, for each analysis model, a corresponding feature map (e.g., feature maps $\hat{f}_1$-$\hat{f}_n$ in FIG. 5B) based on the up-sampled image data. In step 1116, multiple analysis models corresponding to multiple tasks are configured to analyze the input image data and extract, for each analysis model, a corresponding feature map (e.g., feature maps $f_1$-$f_n$ in FIG. 5B) based on the input image data. In step 1117, the up-sampling module is trained based on the loss function associated with the analysis models according to the input image data and the up-sampled image data.

In some embodiments, the phase 1110 for optimizing the up-sampling module and the phase 1120 for optimizing the down-sampling module may apply the same loss function, but use different inputs (e.g., different up-sampled image data) to calculate respective outputs (i.e., the loss) of the loss function.

In another phase 1120 for optimizing the down-sampling module, the up-sampling module remains unchanged. The phase 1120 includes steps 1121, 1123, 1125, 1127, and 1129, which are similar to the steps 1010-1050 in the method 1000 above. Particularly, in step 1121, the down-sampling module (e.g., down-sampling module 210 in FIGS. 5A-5C) is configured to down-sample an input image data (e.g., input image x in FIGS. 5A-5C) to generate the down-sampled image data (e.g., compact image $x_D$ in FIGS. 5A-5C). In step 1123, the up-sampling module (e.g., up-sampling module 240 in FIGS. 5A-5C) is configured to receive the down-sampled image data from the down-sampling module, and to up-sample the down-sampled image data to generate another up-sampled image data (e.g., up-sampled image $\hat{x}_{\Phi 2}$ in FIG. 5C). In step 1125, multiple analysis models (e.g., machine analysis models $M_1$-$M_n$ in FIG. 5C) corresponding to multiple tasks are configured to analyze the another up-sampled image data and extract, for each analysis model, a corresponding feature map (e.g., feature maps $\hat{f}_1$-$\hat{f}_n$ in FIG. 5B) based on the another up-sampled image data. In step 1127, multiple analysis models corresponding to multiple tasks are configured to analyze the input image data and extract, for each analysis model, a corresponding feature map (e.g., feature maps $f_1$-$f_n$ in FIG. 5C) based on the input image data. In step 1129, the down-sampling module is trained based on a loss function associated with the analysis models according to the input image data and the another up-sampled image data.

In some embodiments, the phase 1110 for optimizing the up-sampling module can be performed prior to the phase 1120 for optimizing the down-sampling module in one iteration cycle, but the present embodiments are not limited thereto. In other embodiments, the phase 1110 for optimizing the up-sampling module can be performed after the phase 1120 for optimizing the down-sampling module in one iteration cycle.

By this iterative training algorithm, the down-sampling module and the up-sampling module can be trained and optimized after a number of iterations. In each iteration, a step 1130 is performed after the phase 1110 and the phase 1120 to determine whether the training process is completed. If not, (step 1130—no), the phase 1110 and the phase 1120 are repeated in the next iteration, until the training process is completed (step 1130—yes). In various applications, the criteria for the completion of the training can be respectively set accordingly to achieve the end-to-end optimization for down-sampling and up-sampling modules.

By the methods 1000 and 1100 in FIG. 10 and FIG. 11 above, after the end-to-end optimization for down-sampling and up-sampling modules, the down-sampling and up-sampling modules can perform resampling operations to the image or video data to preserve the machine vision-oriented information and accommodate with image/video codecs and multi-task systems performing various machine analysis tasks. In addition, in some embodiments, the adaptive spatial resampling setting described above can be adopted before the resampling process. Accordingly, the machine analysis performance can be improved with less bitrate required and better analysis accuracy.

Figure 12:
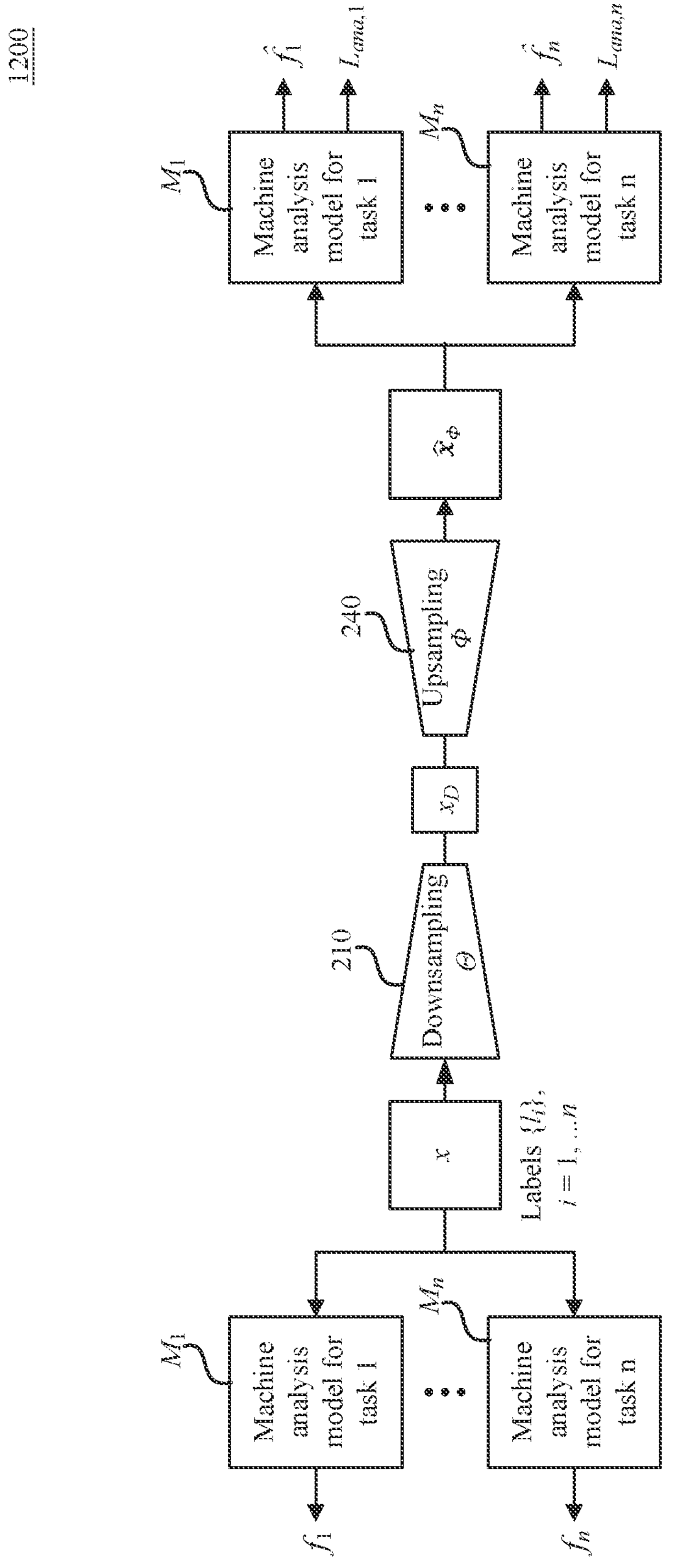
FIG. 12 is a diagram illustrating an exemplary framework for end-to-end optimization of spatial resampling, according to some embodiments of the present disclosure.

FIG. 12 is a diagram illustrating another framework 1200 for end-to-end optimization of spatial resampling, according to some embodiments of the present disclosure. Compared to the framework 500 in FIG. 5A-FIG. 5C, the framework 1200 is optimized in an end-to-end manner by skipping the codec in the training stage. As shown in FIG. 12, the input image x is fed into the down-sampling module 210 to obtain the compact image $x_D$. The compact image $x_D$ is then directly fed into the up-sampling module 240 to obtain the up-sampled image $\hat{x}_\Phi$, without using the encoder and the decoder. Similar to the embodiments of FIG. 4, multiple machine analysis models may be configured to perform analysis for multiple tasks to an image of interest. For example, the framework 1200 may include n pre-trained machine analysis models $M_1$-$M_n$ associated with n different tasks. Accordingly, the i-th machine analysis model $M_i$ is configured to obtain an extracted feature map $f_i$ from the input image x, and obtain an extracted feature map $\hat{f}_i$ from the up-sampled image $\hat{x}_\Phi$ respectively. In addition, in some embodiments, for each machine analysis model $M_i$, a corresponding machine analysis loss function $L_{ana,i}$ can be determined according to the definition of the machine analysis model $M_i$. Thus, based on the input image x, the up-sampled image $\hat{x}_\Phi$, the extracted feature maps $f_i$ and $\hat{f}_i$, and machine analysis loss functions $L_{ana,1}$-$L_{ana,n}$ for machine analysis models $M_1$-$M_n$, a joint loss function for multitask learning can be proposed for training the down-sampling module 210 and the up-sampling module 240.

Figure 13:
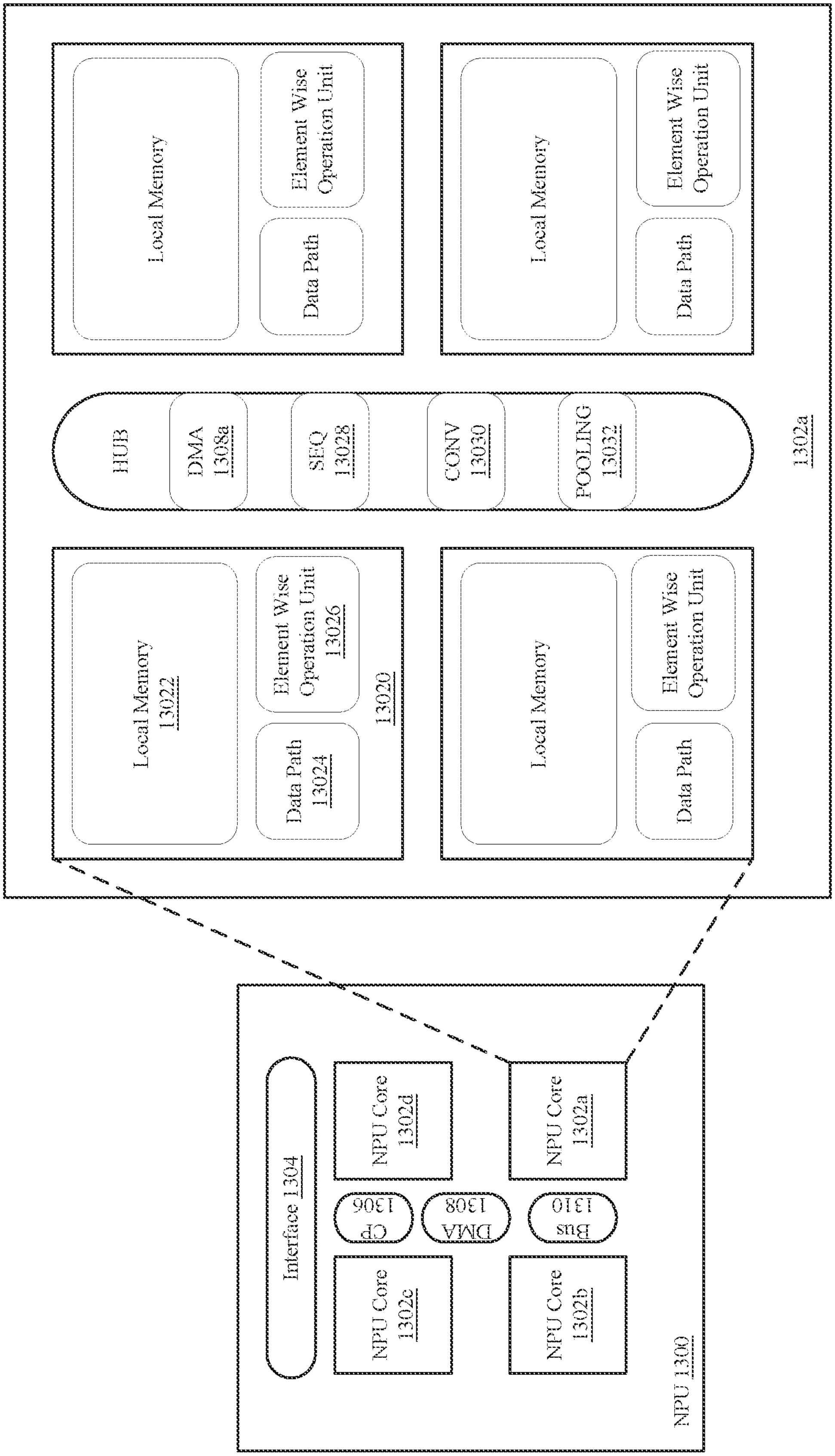
FIG. 13 is a diagram illustrating an exemplary neural processing unit, according to some embodiments of the present disclosure.

In some embodiments, the frameworks 200, 400, 500, and 1200 shown in FIG. 2, FIG. 4, FIGS. 5A-5C, and FIG. 12, and the methods shown in FIGS. 8-11 can be performed using one or more neural processing units ("NPUs"). FIG. 13 shows an exemplary neural processing unit 1300, according to some embodiments of the present disclosure. As shown in FIG. 13, NPU 1300 can include at least one core 1302 (e.g., 1302*a*, 1302*b*, 1302*c*, and 1302*d*), an interface 1304, a command parser (CP) 1306, a direct memory access (DMA) unit 1308, and the like. It is appreciated that NPU 1300 can also include a bus 1310, a global memory (not shown), and the like. It is appreciated that the neural networks and the methods described in various embodiments of the present disclosure can be performed using NPU 1300 shown in FIG. 13. For example, in some embodiments, NPU 1300 can be used to perform the methods shown in FIG. 8 to FIG. 11. In some embodiments, NPU 1300 may include multiple machine analysis models $M_1$-$M_n$ in FIG. 4, FIGS. 5A-5C, and FIG. 12.

Interface 1304 can provide communication between NPU 1300 and outside devices. For example, interface 1304 can include a peripheral component interconnect express (PCI-E) interface, which provides connection with a host unit (not shown in FIG. 13). Interface 1304 can also include at least one of a universal serial bus (USB), a joint test action group (JTAG) interface, a TUN/TAP interface, and the like.

CP 1306 can interact with the host unit under the supervision of kernel mode driver (KMD) and pass neural network task, the pertinent commands or instruction and data to each NPU core 1302. CP 1306 can include circuitry configured to perform the interaction with the host unit and passing of neural network task, the pertinent commands or instruction and data to each NPU core 1302. In some embodiments, CP 1306 can receive a DMA command from the host unit, and load instructions for a neural network (e.g., a sequence of instructions for the neural network generated by a compiler in the host unit), weights or scale/bias constant of the neural network to an NPU core 1302 according to the DMA command. For example, CP 1306 can load instructions for neural network from an external memory to an instruction buffer of the NPU core 1302, weights to a local memory 13022 of the NPU core 1302, or scale/bias constant to a constant buffer of the NPU core 1302, according to the DMA command. In some embodiments, CP 1306 can work with a host unit or KMD to distribute neural network tasks (e.g., recognition of an image, including data for the image) to NPU core 1302. For example, the host unit or KMD can send a neural network task to a queue for an NPU core 1302 to which the neural network task is assigned, and CP 1306 can distribute the neural network task to the NPU core 1302. In some embodiments, when neural network task is finished on NPU core 1302 (e.g., NPU core 1302 can send a "compute done" message to CP 1306), CP 1306 can notify the host unit or KMD. A new neural network task can be assigned to the NPU core 1302 by the host unit or KMD.

DMA unit 1308 can assist with transferring data between components of NPU 1300. DMA unit 1308 can include circuitry configured to perform transfer of data or commands. For example, DMA unit 1308 can assist with transferring data between multiple NPU cores (e.g., cores 1302*a*-1302*d*) or within each NPU core. DMA unit 1308 can also allow off-chip devices to access both on-chip and off-chip memory via interface 1304 without causing an interruption. For example, DMA unit 1308 can load data or instructions into local memory of NPU cores. Thus, DMA unit 1308 can also generate memory addresses and initiate memory read or write cycles. DMA unit 1308 also can contain several hardware registers that can be written and read by the one or more processors, including a memory address register, a byte-count register, one or more control registers, and other types of registers. These registers can specify some combination of the source, the destination, the direction of the transfer (reading from the input/output (I/O) device or writing to the I/O device), the size of the transfer unit, or the number of bytes to transfer in one burst. It is appreciated that each NPU core (e.g., core 1302*a*) can include a sub DMA unit, which can be used to transfer data within the NPU core.

DMA unit 1308 can also move block data among NPU cores via bus 1310. While a single NPU core is capable of handling a typical inference task (e.g., ResNet50 v1), NPU cores can also work together via the bus to take on large and complex tasks (e.g., RestNet101, Mask R-CNN, and the like).

Bus 1310 can provide high speed cross NPU cores communication. Bus 1310 also connects the NPU cores with other units, such as the off-chip memory or peripherals.

Core 1302 (e.g., core 1302*a*) can include one or more processing units configured to perform one or more operations (e.g., multiplication, addition, multiply-accumulate, element-wise operation, etc.) based on commands received from, e.g., CP 1306. For example, core 1302 can receive a neural network task, instructions and data (e.g., weights or scale/bias constant of a neural network) from CP 1306, and execute the instructions using the data. In some embodiments, when NPU core 1302 finishes neural network task, it can notify CP 1306. For example, NPU core 1302 can send a "compute done" message to CP 1306. As shown in FIG. 13, core 1302*a* can include at least one operation unit 13020, a sequencer 13028, a convolution unit 13030, a pooling unit 13032, and a DMA unit 1308*a*, which can be connected via a data fabric and arbitration sub-system (also referred to as a HUB unit). In some embodiments, the HUB unit can include circuitry configured to provide convolution data and pooling data associated with the neural network task to convolution unit 13030 and pooling unit 13032, respectively.

Operation unit 13020 can include circuitry configured to perform operations on received data (e.g., matrices). In some embodiments, each operation unit 13020 can further include a local memory 13022, a matrix multiplication data path (DP) 13024, and an in-lined element-wise operation (EWOP) unit 13026. Local memory 13022 can provide storage space with fast read/write speed. To reduce possible interaction with a global memory, storage space of local memory 13022 can be 180 megabytes (MB) and above. With the massive storage space, most of data access can be performed within core 1302, reducing the latency caused by data access. DP 13024 can include circuitry configured to perform matrix multiplication (e.g., dot production), and EWOP unit 13026 can include circuitry configured perform element-wise operation on received data (e.g., vector-vector multiplication). It is appreciated that, though FIG. 13 shows four operation units 13020, core 1302*a* can include more or less operation units 13020.

Sequencer 13028 can be coupled with the instruction buffer and include circuitry configured to retrieve instructions (or commands) and distribute the instructions to components of e.g., core 1302. For example, sequencer 13028 can include circuitry configured to distribute convolution instructions to convolution unit 13030 to perform convolution operations or distribute pooling instructions to pooling unit 13032 to perform pooling operations. In some embodiments, sequencer 13028 can include circuitry configured to modify the pertinent instructions stored in the instruction buffer of each NPU core 1302, so that NPU cores 1302 can work in parallel as much as possible. Sequencer 13028 can also include circuitry configured to monitor execution of a neural network task and parallelize sub-tasks of the neural network task to improve efficiency of the execution.

Convolution unit 13030 can be coupled with sequencer 13028 and one or more operation units 13020 and include circuitry configured to instruct the one or more operation units 13020 to perform convolution operations. In some embodiments, convolution unit 13030 can send commands to local memory 13022 to send activation data and weight data to data path 13024 for performing convolution operations.

Pooling unit 13032 can further include an interpolation unit, a pooling data path, and the like, and include circuitry configured to perform pooling operations. For example, the interpolation unit can include circuitry configured to interpolate pooling data. The pooling data path can include circuitry configured to perform a pooling operation on the interpolated pooling data.

DMA unit 1308*a* can be part of DMA unit 1308 or an independent unit of each core. DMA unit 1308*a* includes circuitry configured to transfer data or commands. Commands can also be distributed to DMA unit 1308*a* to instruct DMA unit 1308*a* to load instructions/commands or data from a local memory (e.g., local memory 13022 of FIG. 13) into corresponding units. The loaded instructions/commands or data may then be distributed to each processing unit assigned with the corresponding task, and the one or more processing units may process these instructions/commands.

Figure 14:
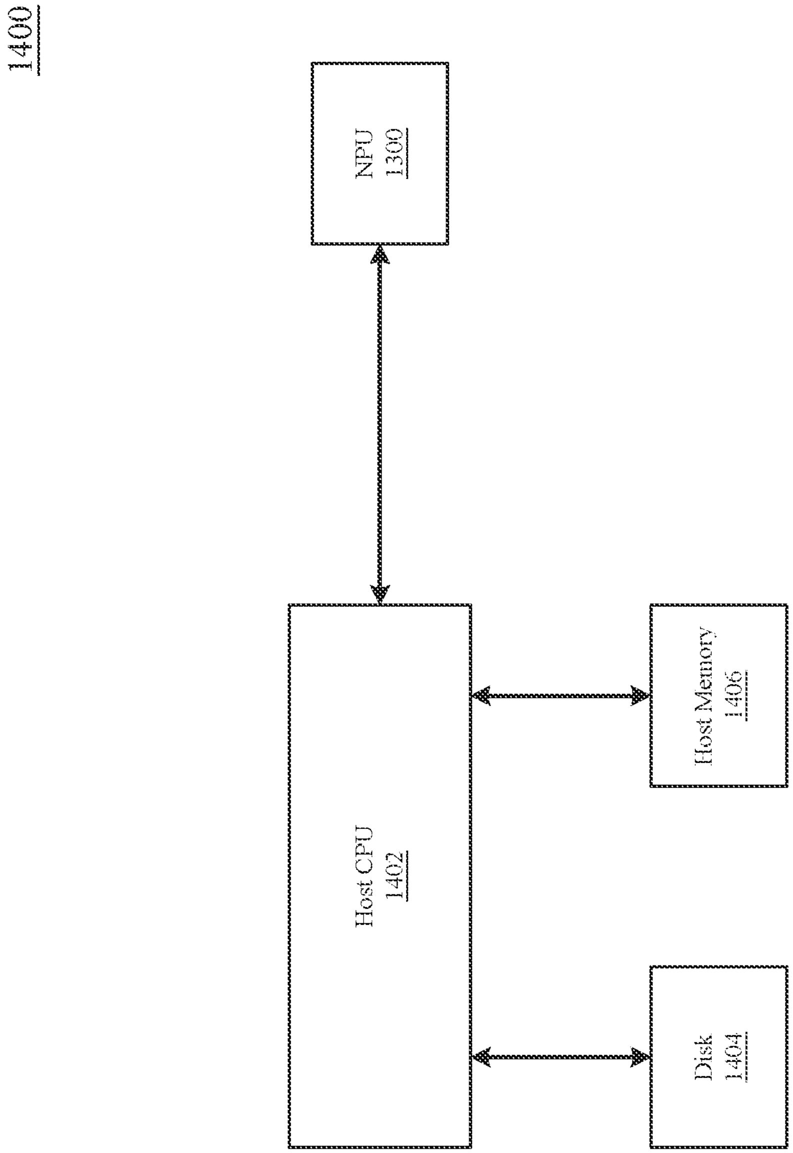
FIG. 14 is a diagram illustrating an exemplary machine learning system, according to some embodiments of the present disclosure.

FIG. 14 shows an exemplary machine learning system 1400, according to some embodiments of the present disclosure. As shown in FIG. 14, machine learning system 1400 may include a host CPU 1402, a disk 1404, a host memory 1406, and a neural network processing unit (NPU) 1300. In some embodiments, host memory 1406 may be an integral memory or an external memory associated with host CPU 1402. Host memory 1406 may be a local or a global memory. In some embodiments, disk 1404 may comprise an external memory configured to provide additional memory for host CPU 1402. It is appreciated that the neural networks and the methods described above in various embodiments of the present disclosure can be performed using the machine learning system 1400 shown in FIG. 14.

Host CPU 1402 (e.g., an X86 or ARM central processing unit) can be coupled with host memory 1406 and disk 1404, configured to process general instructions. NPU 1300 may be connected to host CPU 1402 through a peripheral interface (e.g., interface 1304). As referred to herein, a neural network processing unit (e.g., NPU 1300) may be a computing device for accelerating neural network inference tasks. In some embodiments, NPU 1300 may be configured to be used as a co-processor of host CPU 1402.

In some embodiments, Host CPU 1402 is configured to perform encoding and decoding processes 600A, 600B, 700A, or 700B. NPU is configured to perform convolutions (e.g., down-sampling 210 and up-sampling 240) and machine analysis (e.g., machine analysis models $M_1$-$M_n$).

In some embodiments, a compiler may be on a host unit (e.g., host CPU 1402 or host memory 1406 of FIG. 14) or NPU 1300, configured to push one or more commands to NPU 1300. The compiler is a program or computer software that transforms computer codes written in one programming language into instructions for NPU 1300 to create an executable program. In machine learning applications, a compiler can perform a variety of operations, for example, preprocessing, lexical analysis, parsing, semantic analysis, conversion of input programs to an intermediate representation, initialization of a neural network, code optimization, and code generation, or combinations thereof. For example, in machine learning system 1400, the compiler can compile a neural network to generate static parameters, e.g., connections among neurons and weights of the neurons.

As discussed above, these instructions or commands can be further loaded by CP 1306 of NPU 1300, temporarily stored in an instruction buffer of NPU 1300, and distributed (e.g., by sequencer 13028) to processing units of NPU 1300 (e.g., convolution unit 13030, pooling unit 13032, and DMA unit 1308*a*) accordingly.

It is appreciated that the first few instructions received by the NPU cores may instruct the NPU cores to load/store data from host memory 1406 into one or more local memories (e.g., local memory 13022 of FIG. 13) of the NPU core.

Each NPU core may then initiate the instruction pipeline, which involves fetching the instruction (e.g., via a sequencer) from the instruction buffer, decoding the instruction (e.g., via a DMA unit) and generating local memory addresses (e.g., corresponding to an operand), reading the source data, executing or loading/storing operations, and then writing back results.

Accordingly, the machine learning system 1400 may provide a system for image or video processing. The host memory 1406 stores a set of instructions, and the host CPU 1402 is configured to execute the set of instructions to cause the system to perform the resampling and encoding/decoding process. For example, during the encoding process, the host CPU 1402 may execute the set of instructions to receive an input image, down-sample, by the down-sampling module, the input image to generate a down-sampled image data, and compress the down-sampled image data to obtain a quantized and compressed bitstream. The down-sampling module may be trained based on the loss function associated with analysis models during the training stage with the methods discussed above using training image data. In some embodiments, the host CPU 1202 may execute the set of instructions to select a resampling factor based on parameters of the input image before down-sampling the input image based on the resampling factor, and provide the bitstream having an index representing the resampling factor and coded data obtained by compressing the down-sampled image data. Accordingly, when the bitstream is transmitted to the decoder, the decoder can decode the bitstream and perform the up-sampling based on the same resampling factor. As discussed above, the parameters of the input image for the selection of the resampling factor may include the width and the height of the input image, and the area of object regions calculated by the instance segmentation network performing the instance segmentation to the input image.

Similarly, during the decoding process, the host CPU 1402 may execute the set of instructions to receive a bitstream including coded data associated with an input image, decode the bitstream to obtain a reconstructed image data, and up-sample, by an up-sampling module, the reconstructed image data to generate an up-sampled image data corresponding to the input image. The up-sampling module may be trained based on the loss function associated with analysis models during the training stage with the methods discussed above using training image data. In some embodiments, the bitstream may include both an index representing a resampling factor selected based on parameters of the input image, and the coded data associated with the input image. Accordingly, the host CPU 1402 may execute the set of instructions to up-sample the reconstructed image data based on the resampling factor to generate the up-sampled image data.

Figure 15:
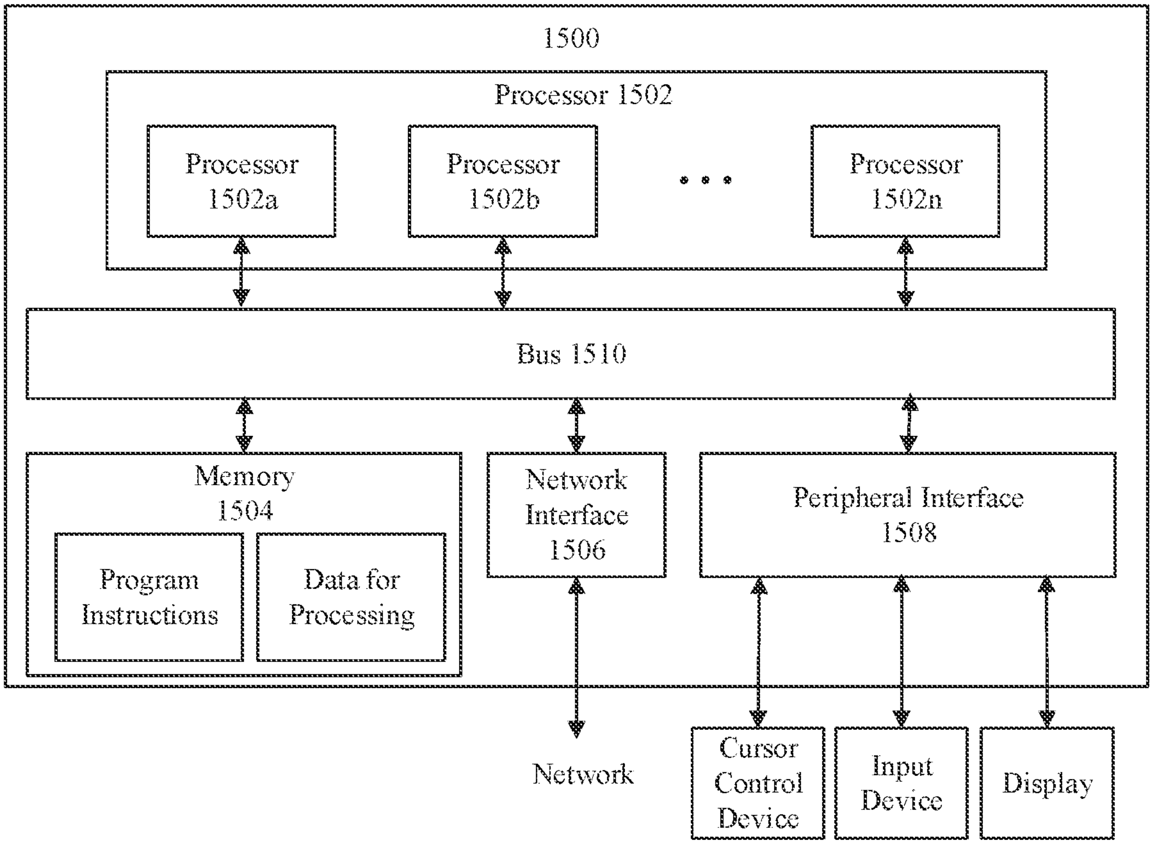
FIG. 15 is a block diagram of an exemplary apparatus for preprocessing or coding image data, according to some embodiments of the present disclosure.

Referring back to FIG. 1, FIG. 2, FIG. 4, and FIG. 5A-5C, image/video encoder 120, image/video decoder 130, and codec Co may be implemented as any suitable hardware, software, or a combination thereof. FIG. 15 is a block diagram of an example apparatus 1500 for processing image data, consistent with embodiments of the disclosure. For example, apparatus 1500 may be a preprocessor, an encoder, or a decoder. As shown in FIG. 15, apparatus 1500 can include processor 1502. When processor 1502 executes instructions described herein, apparatus 1500 can become a specialized machine for preprocessing, encoding, or decoding image data. Processor 1502 can be any type of circuitry capable of manipulating or processing information. For example, processor 1502 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 15, processor 1502 can include multiple processors, including processor 1502*a*, processor 1502*b*, and processor 1502*n*.

Apparatus 1500 can also include memory 1504 configured to store data (e.g., a set of instructions, computer codes, intermediate data, or the like). For example, as shown in FIG. 15, the stored data can include program instructions (e.g., program instructions for implementing the stages in processes 600A, 600B, 700A, or 700B) and data for processing (e.g., video sequence 602, video bitstream 628, or video stream 704). Processor 1502 can access the program instructions and data for processing (e.g., via bus 1510), and execute the program instructions to perform an operation or manipulation on the data for processing. Memory 1504 can include a high-speed random-access storage device or a non-volatile storage device. In some embodiments, memory 1504 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 1504 can also be a group of memories (not shown in FIG. 15) grouped as a single logical component.

Bus 1510 can be a communication device that transfers data between components inside apparatus 1500, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 1500.

Apparatus 1500 can further include network interface 406 to provide wired or wireless communication with a network (e.g., the Internet, an intranet, a local area network, a mobile communications network, or the like). In some embodiments, network interface 1506 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, a near-field communication ("NFC") adapter, a cellular network chip, or the like.

In some embodiments, optionally, apparatus 1500 can further include peripheral interface 408 to provide a connection to one or more peripheral devices. As shown in FIG. 15, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 600A, 600B, 700A, or 700B) can be implemented as any combination of any software or hardware modules in apparatus 1500. For example, some or all stages of process 600A, 600B, 700A, or 700B can be implemented as one or more software modules of apparatus 1500, such as program instructions that can be loaded into memory 1504. For another example, some or all stages of process 600A, 600B, 700A, or 700B can be implemented as one or more hardware modules of apparatus 1500, such as a specialized data processing circuit (e.g., an FPGA, an ASIC, an NPU, or the like).

In some embodiments, a non-transitory computer-readable storage medium including instructions is also provided, and the instructions may be executed by one or more processors of a device, for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above-described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above-described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the disclosure disclosed herein. It is intended that the specification and examples be considered as exemplary only, with a true scope and spirit of the disclosure being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

The embodiments may further be described using the following clauses:

1. A computer-implemented method for down-sampling an input image data in YUV format, wherein the method comprises:
   - performing a plurality of convolutions on the input image data: wherein performing the plurality of convolutions comprises:
     - performing a first stage convolution on the input image data, wherein the first stage convolution comprises a first convolution and a second convolution that are provided in parallel;
     - performing a second stage convolution on a channel-wise concatenation result of an output of the first convolution and an output of the second convolution;
     - performing a third stage convolution on an output of the second stage convolution; and
     - obtaining an output image data based on an output of the third stage convolution.

2. The method according to clause 1, wherein performing the first stage convolution on the input image data further comprising:
   - performing the first convolution on a Y component of the input image data; and
   - performing the second convolution on a channel-wise concatenation result of a U component and a V component of the input image data.

3. The method according to clause 1, wherein performing the third stage convolution on the output of the second stage convolution further comprises:
   - performing a fourth convolution on the output of the second stage convolution; and
   - performing a fifth convolution on the output of the second stage convolution, wherein the fourth convolution and the fifth convolution are provided in parallel.

4. The method according to clause 3, wherein obtaining the output image data based on the output of the third stage convolution further comprises:
   - obtaining a Y component of the output image data based on an output of the fourth convolution; and
   - obtaining a channel-wise concatenation result of a U component and a V component of the output image data based on an output of the fifth convolution.

5. The method according to clause 1, wherein a set of parameters of each of the plurality of convolutions comprises: an input channel number, an output channel number, a kernel size, a stride, and a padding size.

6. The method according to clause 1, wherein a Rectified Linear Unit (ReLU) is applied to the plurality of convolutions as an activation function.

7. The method according to clause 5, wherein the set of parameters is determined based on a type of a YUV format and a number of the plurality of convolutions.

8. The method according to clause 1, wherein the second stage convolution comprises one convolution.

9. A computer-implemented method for up-sampling a down-sampled image data in YUV format, comprising performing a plurality of convolutions on the down-sampled image data, wherein performing the plurality of convolutions comprises:

performing a first stage convolution on the down-sampled image data, wherein the first stage convolution comprises a first convolution and a second convolution provided in parallel;

performing a second stage convolution on a channel-wise concatenation result of an output of the first convolution and an output of the second convolution;

performing a third stage convolution on an output of the second stage convolution;

performing a bicubic interpolation on the down-sampled image data to obtain a bicubic interpolation result; and performing an element-wise addition to an output of third stage convolution and the bicubic interpolation result to obtain an up-sampled image data.

10. The method according to clause 9, wherein performing the first stage convolution on the image data comprises:

performing the first convolution on a Y component of the down-sampled image data; and performing the second convolution on a channel-wise concatenation result of a U component and a V component of the down-sampled image data.

11. The method according to clause 10, wherein the second convolution is a transposed convolution.

12. The method according to clause 9, wherein the second stage convolution comprises a series of convolutions.

13. The method according to clause 12, wherein the second stage convolution comprises 18 conversions in series.

14. The method according to clause 10, wherein performing the third stage convolution on the output of the second stage convolution further comprises:

performing a fourth convolution on the output of the second stage convolution; and performing a fifth convolution on the output of the second stage convolution, wherein the four convolution and the fifth convolution are provided in parallel.

15. The method according to clause 14, wherein the fourth convolution is a transposed convolution.

16. The method according to clause 14, wherein performing the element-wise addition to the output of third stage convolution and the bicubic interpolation result to obtain the up-sampled image data, further comprises:

performing a first element-wise addition to an output of the fourth convolution and a first bicubic interpolation result of a Y component of the image data to obtain a Y component of the up-sampled image data; and performing a second element-wise addition to an output of the fifth convolution and a second bicubic interpolation result of the channel-wise concatenation result of the U component and the V component of the image data to obtain a channel-wise concatenation result of a U component and a V component of the up-sampled image data.

17. The method according to clause 9, wherein a set of parameters of each of the plurality of convolutions comprises: an input channel number, an output channel number, a kernel size, a stride, and a padding size.

18. The method according to clause 17, wherein the set of parameters is determined based on a type of a YUV format and a number of the plurality of convolutions.

19. The method according to clause 9, wherein a Rectified Linear Unit (ReLU) is applied to each convolution in the first stage convolution and the second stage convolution as an activation function.

20. A computer-implemented method for resampling an image data in YUV format, comprising:

converting the image data in YUV format to an image data in RGB (Red-Green-Blue) format;

performing resampling on the image data in RGB format to obtain an output image data in RGB format, wherein the resampling comprising a down-sampling and an up-sampling; and converting the output image data in RGB format to an output image data in YUV format.

21. A computer-implemented method for training spatial resampling modules, comprising:

down-sampling, by a down-sampling module, an input image data in a YUV format to generate a down-sampled image data in the YUV format;

up-sampling, by an up-sampling module, the down-sampled image data or a reconstructed image data corresponding to the down-sampled image data to generate an up-sampled image data in the YUV format;

analyzing, by a plurality of analysis models corresponding to a plurality of tasks, the up-sampled image data; and training the down-sampling module based on a loss function associated with the plurality of analysis models according to the input image data and the up-sampled image data.

22. The method according to clause 21, further comprising:

training the up-sampling module based on the same loss function associated with the plurality of analysis models according to the input image data and the up-sampled image data.

23. The method according to clause 21, further comprising:

compressing, by an encoder, the down-sampled image data to obtain a quantized and compressed bitstream; and decoding, by a decoder, the bitstream to obtain the reconstructed image data in the YUV format.

24. The method according clause 21, wherein the loss function comprises a contour loss function, a plurality of feature map distortions respectively associated with the analysis models, a plurality of analysis loss functions respectively associated with the analysis models, or any combinations thereof.

25. The method according to clause 24, wherein each feature map distortion is obtained based on extracted feature maps of the corresponding analysis model from the input image data and the up-sampled image data.

26. The method according to clause 21, wherein down-sampling, by the down-sampling module, the input image data in a YUV format to generate the down-sampled image data in the YUV format comprises:

performing a first stage convolution on an input image data, wherein the first stage convolution comprises a first convolution and a second convolution that are provided in parallel;

performing a second stage convolution on a channel-wise concatenation result of an output of the first convolution and an output of the second convolution;

performing a third stage convolution on an output of the second stage convolution; and obtaining a down-sampled image data based on an output of the third stage convolution.

27. The method according to clause 26, wherein performing the first stage convolution on the input image data further comprising:

performing the first convolution on a Y component of the input image data; and performing the second convolution on a channel-wise concatenation result of a U component and a V component of the input image data.

28. The method according to clause 27, wherein performing the third stage convolution on the output of the second stage convolution further comprises:

performing a fourth convolution on the output of the second stage convolution; and performing a fifth convolution on the output of the second stage convolution, wherein the fourth convolution and the fifth convolution are provided in parallel.

29. The method according to clause 28, wherein obtaining the output image data based on the output of the third stage convolution further comprises:

obtaining a Y component of the output image data based on an output of the fourth convolution; and obtaining a channel-wise concatenation result of a U component and a V component of the output image data based on an output of the fifth convolution.

30. The method according to clause 21, wherein up-sampling, by the up-sampling module, the down-sampled image data or the reconstructed image data corresponding to the down-sampled image data to generate the up-sampled image data in the YUV format comprises:

performing a first stage convolution on the down-sampled image data or the reconstructed image data, wherein the first stage convolution comprises a first convolution and a second convolution that are provided in parallel;

performing a second stage convolution on a channel-wise concatenation result of an output of the first convolution and an output of the second convolution;

performing a third stage convolution on an output of the second stage convolution;

performing a bicubic interpolation on the image data to obtain a bicubic interpolation result; and performing an element-wise addition to an output of third stage convolution and the bicubic interpolation result to obtain the up-sampled image data.

31. The method according to clause 30, wherein performing the first stage convolution on the image data comprises:

performing the first convolution on a Y component of the down-sampled image data; and performing the second convolution on a channel-wise concatenation result of a U component and a V component of the down-sampled image data.

32. The method according to clause 31, wherein the second convolution is a transposed convolution.

33. The method according to clause 30, wherein the second stage convolution comprises a series of convolutions.

34. The method according to clause 33, wherein the second stage convolution comprises 18 conversions in series.

35. The method according to clause 31, wherein performing the third stage convolution on the output of the second stage convolution further comprises:

performing a fourth convolution on the output of the second stage convolution; and performing a fifth convolution on the output of the second stage convolution, wherein the four convolution and the fifth convolution are provided in parallel.

36. The method according to clause 35, wherein the fourth convolution is a transposed convolution.

37. The method according to clause 35, wherein performing the element-wise addition to the output of third stage convolution and the bicubic interpolation result to obtain the up-sampled image data, further comprises:

performing a first element-wise addition to an output of the fourth convolution and a first bicubic interpolation result of a Y component of the image data to obtain a Y component of the up-sampled image data; and performing a second element-wise addition to an output of the fifth convolution and a second bicubic interpolation result of the channel-wise concatenation result of the U component and the V component of the image data to obtain a channel-wise concatenation result of a U component and a V component of the up-sampled image data.

38. An apparatus for down-sampling an input image data in YUV format, the apparatus comprising:

a memory configured to store instructions; and one or more processors configured to execute the instructions to cause the apparatus to perform operations comprising:

performing a plurality of convolutions on the input image data: wherein performing the plurality of convolutions comprises:

performing a first stage convolution on the input image data, wherein the first stage convolution comprises a first convolution and a second convolution that are provided in parallel;

performing a second stage convolution on a channel-wise concatenation result of an output of the first convolution and an output of the second convolution;

performing a third stage convolution on an output of the second stage convolution; and obtaining an output image data based on an output of the third stage convolution.

39. The apparatus according to clause 38, wherein performing the first stage convolution on the input image data further comprising:

performing the first convolution on a Y component of the input image data; and performing the second convolution on a channel-wise concatenation result of a U component and a V component of the input image data.

40. The apparatus according to clause 38, wherein performing the third stage convolution on the output of the second stage convolution further comprises:

performing a fourth convolution on the output of the second stage convolution; and performing a fifth convolution on the output of the second stage convolution, wherein the fourth convolution and the fifth convolution are provided in parallel.

41. The apparatus according to clause 40, wherein obtaining the output image data based on the output of the third stage convolution further comprises:

obtaining a Y component of the output image data based on an output of the fourth convolution; and obtaining a channel-wise concatenation result of a U component and a V component of the output image data based on an output of the fifth convolution.

42. The apparatus according to clause 38, wherein a set of parameters of each of the plurality of convolutions comprises: an input channel number, an output channel number, a kernel size, a stride, and a padding size.

43. The apparatus according to clause 38, wherein a Rectified Linear Unit (ReLU) is applied to the plurality of convolutions as an activation function.

44. The apparatus according to clause 42, wherein the set of parameters is determined based on a type of a YUV format and a number of the plurality of convolutions.

45. The apparatus according to clause 38, wherein the second stage convolution comprises one convolution.

46. An apparatus for up-sampling a down-sampled image data in YUV format, the apparatus comprising:

a memory configured to store instructions; and one or more processors configured to execute the instructions to cause the apparatus to perform operations comprising:

performing a plurality of convolutions on the down-sampled image data, wherein performing the plurality of convolutions comprises:

performing a first stage convolution on the down-sampled image data, wherein the first stage convolution comprises a first convolution and a second convolution provided in parallel;

performing a second stage convolution on a channel-wise concatenation result of an output of the first convolution and an output of the second convolution;

performing a third stage convolution on an output of the second stage convolution;

performing a bicubic interpolation on the down-sampled image data to obtain a bicubic interpolation result; and performing an element-wise addition to an output of third stage convolution and the bicubic interpolation result to obtain an up-sampled image data.

47. The apparatus according to clause 46, wherein performing the first stage convolution on the image data comprises:

performing the first convolution on a Y component of the down-sampled image data; and performing the second convolution on a channel-wise concatenation result of a U component and a V component of the down-sampled image data.

48. The apparatus according to clause 47, wherein the second convolution is a transposed convolution.

49. The apparatus according to clause 46, wherein the second stage convolution comprises a series of convolutions.

50. The apparatus according to clause 49, wherein the second stage convolution comprises 18 conversions in series.

51. The apparatus according to clause 47, wherein performing the third stage convolution on the output of the second stage convolution further comprises:

performing a fourth convolution on the output of the second stage convolution; and performing a fifth convolution on the output of the second stage convolution, wherein the four convolution and the fifth convolution are provided in parallel.

52. The apparatus according to clause 51, wherein the fourth convolution is a transposed convolution.

53. The apparatus according to clause 51, wherein performing the element-wise addition to the output of third stage convolution and the bicubic interpolation result to obtain the up-sampled image data, further comprises:

performing a first element-wise addition to an output of the fourth convolution and a first bicubic interpolation result of a Y component of the image data to obtain a Y component of the up-sampled image data; and performing a second element-wise addition to an output of the fifth convolution and a second bicubic interpolation result of the channel-wise concatenation result of the U component and the V component of the image data to obtain a channel-wise concatenation result of a U component and a V component of the up-sampled image data.

54. The apparatus according to clause 46, wherein a set of parameters of each of the plurality of convolutions comprises: an input channel number, an output channel number, a kernel size, a stride, and a padding size.

55. The apparatus according to clause 54, wherein the set of parameters is determined based on a type of a YUV format and a number of the plurality of convolutions.

56. The apparatus according to clause 46, wherein a Rectified Linear Unit (ReLU) is applied to each convolution in the first stage convolution and the second stage convolution as an activation function.

57. An apparatus for resampling an image data in YUV format, the apparatus comprising:

a memory configured to store instructions; and one or more processors configured to execute the instructions to cause the apparatus to perform operations comprising:

converting the image data in YUV format to an image data in RGB (Red-Green-Blue) format;

performing resampling on the image data in RGB format to obtain an output image data in RGB format, wherein the resampling comprising a down-sampling and an up-sampling; and converting the output image data in RGB format to an output image data in YUV format.

58. An apparatus for training spatial resampling modules, the apparatus comprising:

a memory configured to store instructions; and one or more processors configured to execute the instructions to cause the apparatus to perform operations comprising:

down-sampling, by a down-sampling module, an input image data in a YUV format to generate a down-sampled image data in the YUV format;

up-sampling, by an up-sampling module, the down-sampled image data or a reconstructed image data corresponding to the down-sampled image data to generate an up-sampled image data in the YUV format;

analyzing, by a plurality of analysis models corresponding to a plurality of tasks, the up-sampled image data; and training the down-sampling module based on a loss function associated with the plurality of analysis models according to the input image data and the up-sampled image data.

59. The apparatus according to clause 58, further comprising:

training the up-sampling module based on the same loss function associated with the plurality of analysis models according to the input image data and the up-sampled image data.

60. The apparatus according to clause 58, further comprising:

compressing, by an encoder, the down-sampled image data to obtain a quantized and compressed bitstream; and decoding, by a decoder, the bitstream to obtain the reconstructed image data in the YUV format.

61. The apparatus according clause 58, wherein the loss function comprises a contour loss function, a plurality of feature map distortions respectively associated with the analysis models, a plurality of analysis loss functions respectively associated with the analysis models, or any combinations thereof.

62. The apparatus according to clause 61, wherein each feature map distortion is obtained based on extracted feature maps of the corresponding analysis model from the input image data and the up-sampled image data.

63. The apparatus according to clause 58, wherein down-sampling, by the down-sampling module, the input image data in a YUV format to generate the down-sampled image data in the YUV format comprises:
- performing a first stage convolution on an input image data, wherein the first stage convolution comprises a first convolution and a second convolution that are provided in parallel;
- performing a second stage convolution on a channel-wise concatenation result of an output of the first convolution and an output of the second convolution;
- performing a third stage convolution on an output of the second stage convolution; and
- obtaining a down-sampled image data based on an output of the third stage convolution.

64. The apparatus according to clause 63, wherein performing the first stage convolution on the input image data further comprising:
- performing the first convolution on a Y component of the input image data; and
- performing the second convolution on a channel-wise concatenation result of a U component and a V component of the input image data.

65. The apparatus according to clause 64, wherein performing the third stage convolution on the output of the second stage convolution further comprises:
- performing a fourth convolution on the output of the second stage convolution; and
- performing a fifth convolution on the output of the second stage convolution, wherein the fourth convolution and the fifth convolution are provided in parallel.

66. The apparatus according to clause 65, wherein obtaining the output image data based on the output of the third stage convolution further comprises:
- obtaining a Y component of the output image data based on an output of the fourth convolution; and
- obtaining a channel-wise concatenation result of a U component and a V component of the output image data based on an output of the fifth convolution.

67. The apparatus according to clause 58, wherein up-sampling, by the up-sampling module, the down-sampled image data or the reconstructed image data corresponding to the down-sampled image data to generate the up-sampled image data in the YUV format comprises:
- performing a first stage convolution on the down-sampled image data or the reconstructed image data, wherein the first stage convolution comprises a first convolution and a second convolution that are provided in parallel;
- performing a second stage convolution on a channel-wise concatenation result of an output of the first convolution and an output of the second convolution;
- performing a third stage convolution on an output of the second stage convolution;
- performing a bicubic interpolation on the image data to obtain a bicubic interpolation result; and
- performing an element-wise addition to an output of third stage convolution and the bicubic interpolation result to obtain the up-sampled image data.

68. The apparatus according to clause 67, wherein performing the first stage convolution on the image data comprises:
- performing the first convolution on a Y component of the down-sampled image data; and
- performing the second convolution on a channel-wise concatenation result of a U component and a V component of the down-sampled image data.

69. The apparatus according to clause 68, wherein the second convolution is a transposed convolution.

70. The apparatus according to clause 67, wherein the second stage convolution comprises a series of convolutions.

71. The apparatus according to clause 70, wherein the second stage convolution comprises 18 conversions in series.

72. The apparatus according to clause 68, wherein performing the third stage convolution on the output of the second stage convolution further comprises:
- performing a fourth convolution on the output of the second stage convolution; and
- performing a fifth convolution on the output of the second stage convolution, wherein the four convolution and the fifth convolution are provided in parallel.

73. The apparatus according to clause 72, wherein the fourth convolution is a transposed convolution.

74. The apparatus according to clause 72, wherein performing the element-wise addition to the output of third stage convolution and the bicubic interpolation result to obtain the up-sampled image data, further comprises:
- performing a first element-wise addition to an output of the fourth convolution and a first bicubic interpolation result of a Y component of the image data to obtain a Y component of the up-sampled image data; and
- performing a second element-wise addition to an output of the fifth convolution and a second bicubic interpolation result of the channel-wise concatenation result of the U component and the V component of the image data to obtain a channel-wise concatenation result of a U component and a V component of the up-sampled image data.

75. A non-transitory computer readable medium that stores a set of instructions that is executable by one or more processors of an apparatus to cause the apparatus to perform operations comprising:
- performing a plurality of convolutions on an input image data in YUV format: wherein performing the plurality of convolutions comprises:
  - performing a first stage convolution on the input image data, wherein the first stage convolution comprises a first convolution and a second convolution that are provided in parallel;
  - performing a second stage convolution on a channel-wise concatenation result of an output of the first convolution and an output of the second convolution;
  - performing a third stage convolution on an output of the second stage convolution; and
  - obtaining an output image data based on an output of the third stage convolution.

76. The non-transitory computer readable medium according to clause 75, wherein performing the first stage convolution on the input image data further comprising:

performing the first convolution on a Y component of the input image data; and performing the second convolution on a channel-wise concatenation result of a U component and a V component of the input image data.

77. The non-transitory computer readable medium according to clause 75, wherein performing the third stage convolution on the output of the second stage convolution further comprises:

performing a fourth convolution on the output of the second stage convolution; and performing a fifth convolution on the output of the second stage convolution, wherein the fourth convolution and the fifth convolution are provided in parallel.

78. The non-transitory computer readable medium according to clause 77, wherein obtaining the output image data based on the output of the third stage convolution further comprises:

obtaining a Y component of the output image data based on an output of the fourth convolution; and obtaining a channel-wise concatenation result of a U component and a V component of the output image data based on an output of the fifth convolution.

79. The non-transitory computer readable medium according to clause 75, wherein a set of parameters of each of the plurality of convolutions comprises: an input channel number, an output channel number, a kernel size, a stride, and a padding size.

80. The non-transitory computer readable medium according to clause 75, wherein a Rectified Linear Unit (ReLU) is applied to the plurality of convolutions as an activation function.

81. The non-transitory computer readable medium according to clause 79, wherein the set of parameters is determined based on a type of a YUV format and a number of the plurality of convolutions.

82. The non-transitory computer readable medium according to clause 75, wherein the second stage convolution comprises one convolution.

83. A non-transitory computer readable medium that stores a set of instructions that is executable by one or more processors of an apparatus to cause the apparatus to perform operations comprising:

performing a plurality of convolutions on a down-sampled image data in YUV format, wherein performing the plurality of convolutions comprises:

performing a first stage convolution on the down-sampled image data, wherein the first stage convolution comprises a first convolution and a second convolution provided in parallel;

performing a second stage convolution on a channel-wise concatenation result of an output of the first convolution and an output of the second convolution;

performing a third stage convolution on an output of the second stage convolution;

performing a bicubic interpolation on the down-sampled image data to obtain a bicubic interpolation result; and performing an element-wise addition to an output of third stage convolution and the bicubic interpolation result to obtain an up-sampled image data.

84. The non-transitory computer readable medium according to clause 83, wherein performing the first stage convolution on the image data comprises:

performing the first convolution on a Y component of the down-sampled image data; and performing the second convolution on a channel-wise concatenation result of a U component and a V component of the down-sampled image data.

85. The non-transitory computer readable medium according to clause 84, wherein the second convolution is a transposed convolution.

86. The non-transitory computer readable medium according to clause 83, wherein the second stage convolution comprises a series of convolutions.

87. The non-transitory computer readable medium according to clause 86, wherein the second stage convolution comprises 18 conversions in series.

88. The non-transitory computer readable medium according to clause 84, wherein performing the third stage convolution on the output of the second stage convolution further comprises:

performing a fourth convolution on the output of the second stage convolution; and performing a fifth convolution on the output of the second stage convolution, wherein the four convolution and the fifth convolution are provided in parallel.

89. The non-transitory computer readable medium according to clause 88, wherein the fourth convolution is a transposed convolution.

90. The non-transitory computer readable medium according to clause 88, wherein performing the element-wise addition to the output of third stage convolution and the bicubic interpolation result to obtain the up-sampled image data, further comprises:

performing a first element-wise addition to an output of the fourth convolution and a first bicubic interpolation result of a Y component of the image data to obtain a Y component of the up-sampled image data; and performing a second element-wise addition to an output of the fifth convolution and a second bicubic interpolation result of the channel-wise concatenation result of the U component and the V component of the image data to obtain a channel-wise concatenation result of a U component and a V component of the up-sampled image data.

91. The non-transitory computer readable medium according to clause 83, wherein a set of parameters of each of the plurality of convolutions comprises: an input channel number, an output channel number, a kernel size, a stride, and a padding size.

92. The non-transitory computer readable medium according to clause 91, wherein the set of parameters is determined based on a type of a YUV format and a number of the plurality of convolutions.

93. The non-transitory computer readable medium according to clause 83, wherein a Rectified Linear Unit (ReLU) is applied to each convolution in the first stage convolution and the second stage convolution as an activation function.

94. A non-transitory computer readable medium that stores a set of instructions that is executable by one or more processors of an apparatus to cause the apparatus to perform operations comprising: converting an image data in YUV format to an image data in RGB (Red-Green-Blue) format;

performing resampling on the image data in RGB format to obtain an output image data in RGB format, wherein the resampling comprising a down-sampling and an up-sampling; and converting the output image data in RGB format to an output image data in YUV format.

95. A non-transitory computer readable medium that stores a set of instructions that is executable by one or more processors of an apparatus to cause the apparatus to perform operations comprising:

down-sampling, by a down-sampling module, an input image data in a YUV format to generate a down-sampled image data in the YUV format;

up-sampling, by an up-sampling module, the down-sampled image data or a reconstructed image data corresponding to the down-sampled image data to generate an up-sampled image data in the YUV format;

analyzing, by a plurality of analysis models corresponding to a plurality of tasks, the up-sampled image data; and training the down-sampling module based on a loss function associated with the plurality of analysis models according to the input image data and the up-sampled image data.

96. The non-transitory computer readable medium according to clause 95, further comprising:

training the up-sampling module based on the same loss function associated with the plurality of analysis models according to the input image data and the up-sampled image data.

97. The non-transitory computer readable medium according to clause 95, further comprising:

compressing, by an encoder, the down-sampled image data to obtain a quantized and compressed bitstream; and decoding, by a decoder, the bitstream to obtain the reconstructed image data in the YUV format.

98. The non-transitory computer readable medium according clause 95, wherein the loss function comprises a contour loss function, a plurality of feature map distortions respectively associated with the analysis models, a plurality of analysis loss functions respectively associated with the analysis models, or any combinations thereof.

99. The non-transitory computer readable medium according to clause 98, wherein each feature map distortion is obtained based on extracted feature maps of the corresponding analysis model from the input image data and the up-sampled image data.

100. The non-transitory computer readable medium according to clause 95, wherein down-sampling, by the down-sampling module, the input image data in a YUV format to generate the down-sampled image data in the YUV format comprises:

performing a first stage convolution on an input image data, wherein the first stage convolution comprises a first convolution and a second convolution that are provided in parallel;

performing a second stage convolution on a channel-wise concatenation result of an output of the first convolution and an output of the second convolution;

performing a third stage convolution on an output of the second stage convolution; and obtaining a down-sampled image data based on an output of the third stage convolution.

101. The non-transitory computer readable medium according to clause 100, wherein performing the first stage convolution on the input image data further comprising:

performing the first convolution on a Y component of the input image data; and performing the second convolution on a channel-wise concatenation result of a U component and a V component of the input image data.

102. The non-transitory computer readable medium according to clause 101, wherein performing the third stage convolution on the output of the second stage convolution further comprises:

performing a fourth convolution on the output of the second stage convolution; and performing a fifth convolution on the output of the second stage convolution, wherein the fourth convolution and the fifth convolution are provided in parallel.

103. The non-transitory computer readable medium according to clause 102, wherein obtaining the output image data based on the output of the third stage convolution further comprises:

obtaining a Y component of the output image data based on an output of the fourth convolution; and obtaining a channel-wise concatenation result of a U component and a V component of the output image data based on an output of the fifth convolution.

104. The non-transitory computer readable medium according to clause 95, wherein up-sampling, by the up-sampling module, the down-sampled image data or the reconstructed image data corresponding to the down-sampled image data to generate the up-sampled image data in the YUV format comprises:

performing a first stage convolution on the down-sampled image data or the reconstructed image data, wherein the first stage convolution comprises a first convolution and a second convolution that are provided in parallel;

performing a second stage convolution on a channel-wise concatenation result of an output of the first convolution and an output of the second convolution;

performing a third stage convolution on an output of the second stage convolution;

performing a bicubic interpolation on the image data to obtain a bicubic interpolation result; and performing an element-wise addition to an output of third stage convolution and the bicubic interpolation result to obtain the up-sampled image data.

105. The non-transitory computer readable medium according to clause 104, wherein performing the first stage convolution on the image data comprises:

performing the first convolution on a Y component of the down-sampled image data; and performing the second convolution on a channel-wise concatenation result of a U component and a V component of the down-sampled image data.

106. The non-transitory computer readable medium according to clause 105, wherein the second convolution is a transposed convolution.

107. The non-transitory computer readable medium according to clause 104, wherein the second stage convolution comprises a series of convolutions.

108. The non-transitory computer readable medium according to clause 107, wherein the second stage convolution comprises 18 conversions in series.

109. The non-transitory computer readable medium according to clause 105, wherein performing the third stage convolution on the output of the second stage convolution further comprises:

performing a fourth convolution on the output of the second stage convolution; and performing a fifth convolution on the output of the second stage convolution, wherein the four convolution and the fifth convolution are provided in parallel.

110. The non-transitory computer readable medium according to clause 109, wherein the fourth convolution is a transposed convolution.

111. The non-transitory computer readable medium according to clause 109, wherein performing the element-wise addition to the output of third stage convolution and the bicubic interpolation result to obtain the up-sampled image data, further comprises:

performing a first element-wise addition to an output of the fourth convolution and a first bicubic interpolation result of a Y component of the image data to obtain a Y component of the up-sampled image data; and performing a second element-wise addition to an output of the fifth convolution and a second bicubic interpolation result of the channel-wise concatenation result of the U component and the V component of the image data to obtain a channel-wise concatenation result of a U component and a V component of the up-sampled image data.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A method of decoding a bitstream to output one or more pictures for a video stream, the method comprising:

receiving a bitstream; and decoding, using coded information of the bitstream, one or more pictures comprising a down-sampled image data in YUV format; and performing a plurality of convolutions on the down-sampled image data, wherein performing the plurality of convolutions comprises:

performing a first stage convolution on the down-sampled image data, wherein the first stage convolution comprises a first convolution and a second convolution provided in parallel;

performing a second stage convolution on a channel-wise concatenation result of an output of the first convolution and an output of the second convolution;

performing a third stage convolution on an output of the second stage convolution, wherein the third stage convolution comprises a fourth convolution and a fifth convolution provided in parallel;

performing a bicubic interpolation on the down-sampled image data to obtain a bicubic interpolation result; and performing an element-wise addition to an output of third stage convolution and the bicubic interpolation result to obtain an up-sampled image data;

wherein performing the element-wise addition to the output of third stage convolution and the bicubic interpolation result to obtain the up-sampled image data, further comprises:

performing a first element-wise addition to an output of the fourth convolution and a first bicubic interpolation result of a Y component of the down-sampled image data to obtain a Y component of the up-sampled image data; and performing a second element-wise addition to an output of the fifth convolution and a second bicubic interpolation result of a channel-wise concatenation result of a U component and a V component of the down-sampled image data to obtain a channel-wise concatenation result of a U component and a V component of the up-sampled image data.

2. The method according to claim 1, wherein performing the first stage convolution on the image data comprises:

performing the first convolution on a Y component of the down-sampled image data; and performing the second convolution on a channel-wise concatenation result of a U component and a V component of the down-sampled image data.

3. The method according to claim 1, wherein the second stage convolution comprises a series of convolutions.

4. The method according to claim 1, wherein performing the third stage convolution on the output of the second stage convolution further comprises:

performing the fourth convolution on the output of the second stage convolution; and performing the fifth convolution on the output of the second stage convolution.

5. The method according to claim 1, wherein a set of parameters of each of the plurality of convolutions comprises: an input channel number, an output channel number, a kernel size, a stride, and a padding size.

6. The method according to claim 5, wherein the set of parameters is determined based on a type of a YUV format and a number of the plurality of convolutions.

7. The method according to claim 1, wherein a Rectified Linear Unit (ReLU) is applied to each convolution in the first stage convolution and the second stage convolution as an activation function.

8. An apparatus for image data processing, comprising:

a memory configured to store instructions; and one or more processors configured to execute the instructions to cause the apparatus to perform operations comprising:

performing a plurality of convolutions on a down-sampled image data in YUV format, wherein performing the plurality of convolutions comprises:

performing a first stage convolution on the down-sampled image data, wherein the first stage convolution comprises a first convolution and a second convolution provided in parallel;

performing a second stage convolution on a channel-wise concatenation result of an output of the first convolution and an output of the second convolution;

performing a third stage convolution on an output of the second stage convolution, wherein the third stage convolution comprises a fourth convolution and a fifth convolution provided in parallel;

performing a bicubic interpolation on the down-sampled image data to obtain a bicubic interpolation result; and performing an element-wise addition to an output of third stage convolution and the bicubic interpolation result to obtain an up-sampled image data;

wherein performing the element-wise addition to the output of third stage convolution and the bicubic interpolation result to obtain the up-sampled image data, further comprises:

performing a first element-wise addition to an output of the fourth convolution and a first bicubic interpolation result of a Y component of the down-sampled image data to obtain a Y component of the up-sampled image data; and performing a second element-wise addition to an output of the fifth convolution and a second bicubic interpolation result of a channel-wise concatenation result of a U component and a V component of the down-sampled image data to obtain a channel-wise concatenation result of a U component and a V component of the up-sampled image data.

9. The apparatus according to claim 8, wherein performing the first stage convolution on the down-sampled image data comprises:

performing the first convolution on a Y component of the down-sampled image data; and performing the second convolution on a channel-wise concatenation result of a U component and a V component of the down-sampled image data.

10. The apparatus according to claim 8, wherein the second stage convolution comprises a series of convolutions.

11. The apparatus according to claim 8, wherein performing the third stage convolution on the output of the second stage convolution further comprises:

performing the fourth convolution on the output of the second stage convolution; and performing the fifth convolution on the output of the second stage convolution.

12. The apparatus according to claim 8, wherein a set of parameters of each of the plurality of convolutions comprises: an input channel number, an output channel number, a kernel size, a stride, and a padding size.

13. The apparatus according to claim 12, wherein the set of parameters is determined based on a type of a YUV format and a number of the plurality of convolutions.

14. The apparatus according to claim 8, wherein a Rectified Linear Unit (ReLU) is applied to each convolution in the first stage convolution and the second stage convolution as an activation function.

15. A non-transitory computer readable medium that stores a set of instructions that is executable by one or more processors of an apparatus to cause the apparatus to perform operations comprising:

performing a plurality of convolutions on a down-sampled image data in YUV format, wherein performing the plurality of convolutions comprises:

performing a first stage convolution on the down-sampled image data, wherein the first stage convolution comprises a first convolution and a second convolution provided in parallel;

performing a second stage convolution on a channel-wise concatenation result of an output of the first convolution and an output of the second convolution;

performing a third stage convolution on an output of the second stage convolution, wherein the third stage convolution comprises a fourth convolution and a fifth convolution provided in parallel;

performing a bicubic interpolation on the down-sampled image data to obtain a bicubic interpolation result; and performing an element-wise addition to an output of third stage convolution and the bicubic interpolation result to obtain an up-sampled image data;

wherein performing the element-wise addition to the output of third stage convolution and the bicubic interpolation result to obtain the up-sampled image data, further comprises:

performing a first element-wise addition to an output of the fourth convolution and a first bicubic interpolation result of a Y component of the down-sampled image data to obtain a Y component of the up-sampled image data; and performing a second element-wise addition to an output of the fifth convolution and a second bicubic interpolation result of a channel-wise concatenation result of a U component and a V component of the down-sampled image data to obtain a channel-wise concatenation result of a U component and a V component of the up-sampled image data.

16. The non-transitory computer readable medium according to claim 15, wherein performing the first stage convolution on the down-sampled image data comprises:

performing the first convolution on a Y component of the down-sampled image data; and performing the second convolution on a channel-wise concatenation result of a U component and a V component of the down-sampled image data.

17. The non-transitory computer readable medium according to claim 15, wherein the second stage convolution comprises a series of convolutions.

18. The non-transitory computer readable medium according to claim 15, wherein performing the third stage convolution on the output of the second stage convolution further comprises:

performing the fourth convolution on the output of the second stage convolution; and performing the fifth convolution on the output of the second stage convolution.

19. The non-transitory computer readable medium according to claim 15, wherein a set of parameters of each of the plurality of convolutions comprises: an input channel number, an output channel number, a kernel size, a stride, and a padding size.

20. The non-transitory computer readable medium according to claim 19, wherein the set of parameters is determined based on a type of a YUV format and a number of the plurality of convolutions.

* * * * *